(12) United States Patent
Landry

(10) Patent No.: US 11,638,364 B1
(45) Date of Patent: Apr. 25, 2023

(54) CRYPTOCURRENCY MINING FURNACE

(71) Applicant: Joel Landry, Grand Lake (CA)

(72) Inventor: Joel Landry, Grand Lake (CA)

(73) Assignee: Hestia Heating Incorporated

( * ) Notice: Subject to any disclaimer, the term of this patent is extended or adjusted under 35 U.S.C. 154(b) by 0 days.

(21) Appl. No.: 17/954,528

(22) Filed: Sep. 28, 2022

(51) Int. Cl.
*H05K 7/20* (2006.01)
*G06F 1/20* (2006.01)

(52) U.S. Cl.
CPC ........... *H05K 7/20145* (2013.01); *G06F 1/20* (2013.01); *H05K 7/20172* (2013.01)

(58) Field of Classification Search
CPC ......... H04L 9/50; H04L 9/0643; H04L 67/10; H05K 7/203; H05K 7/20818; H05K 7/20745; H05K 7/1497; H05K 7/20836; H05K 7/20781; H05K 7/20736; H05K 7/20572; H05K 7/20172; H05K 7/1487; H05K 7/1488; H05K 7/20272; H05K 7/20645; F24F 13/10; F24F 11/80; G06F 9/466; G06F 9/5027; G06F 1/20; G06F 1/206; G06F 1/181; G06F 12/1408; G06F 2115/12; G06F 21/81; G06F 2216/03; G06F 2200/201; G06F 11/3006; H02K 2211/03; F24D 2200/29; F28F 3/027
USPC .......... 165/48.1, 54; 454/171, 233; 707/776; 312/223.2

See application file for complete search history.

(56) References Cited

U.S. PATENT DOCUMENTS

| | | | |
|---|---|---|---|
| 8,548,640 B2 | 10/2013 | Belady et al. | |
| 9,151,515 B2 | 10/2015 | Benoit | |
| 10,455,742 B2 | 10/2019 | Yu et al. | |
| 2017/0042067 A1* | 2/2017 | Parizeau | H05K 7/2079 |
| 2017/0131750 A1* | 5/2017 | Sato | G06F 1/183 |
| 2018/0005326 A1 | 1/2018 | Reid | |
| 2019/0190261 A1* | 6/2019 | Valkov | H02J 1/08 |
| 2019/0204881 A1* | 7/2019 | Plavsic | G06F 1/206 |
| 2019/0310691 A1* | 10/2019 | Ahn | H05K 7/20309 |

(Continued)

OTHER PUBLICATIONS

Hong, "How Does Bitcoin Mining Work?," Investopedia, accessed Sep. 9, 2022 <https://www.investopedia.com/tech/how-does-bitcoin-mining-work> (15 pages).

(Continued)

*Primary Examiner* — Mandeep S Buttar
(74) *Attorney, Agent, or Firm* — Bereskin & Parr LLP

(57) ABSTRACT

A cryptocurrency mining furnace is provided. The cryptocurrency mining furnace comprises a furnace housing having an air flow path extending from a housing air inlet downstream to a housing air outlet; and at least three separate mining computers. Each mining computer is positioned in the furnace housing in the air flow path upstream of the housing air outlet and includes at least one cryptocurrency mining board. The cryptocurrency mining furnace also comprises a transformer positioned in the furnace housing upstream of the mining computers and downstream of the housing air inlet, the transformer electrically connected to each of the mining computers to power each of the mining computers; and a principal fan positioned in the furnace housing in the air flow path downstream of the transformer and upstream of the mining computers to induce air flow along the air flow path through the transformer and each of the mining computers.

18 Claims, 12 Drawing Sheets

(56) References Cited

U.S. PATENT DOCUMENTS

2020/0033837 A1* 1/2020 Simmons ............ H05K 7/20745
2021/0141429 A1* 5/2021 Larocque .............. H04L 67/104
2021/0318735 A1* 10/2021 Barbour .............. G06F 16/2379

OTHER PUBLICATIONS

"Air-Side Economizer," Energy Star, accessed Jul. 14, 2022 <https://www.energystar.gov/products/low_carbon_it_campaign/12_ways_save_energy_data_center/air_side_economizer> (4 pages).

* cited by examiner

CRYPTOCURRENCY MINING FURNACE

FIELD

This document relates to methods and apparatuses for cryptocurrency mining furnaces.

BACKGROUND

A cryptocurrency is a type of virtual asset that is protected using cryptography. Cryptocurrencies, such as Bitcoin, use blockchain technology to record transactions involving the cryptocurrency in a blockchain ledger. Cryptocurrency mining is the process by which new cryptocurrency tokens are entered into circulation. Cryptocurrency mining includes the process by which new cryptocurrency tokens are entered into circulation and the process of verifying new cryptocurrency transactions to prevent the "double-spending problem" in which a cryptocurrency owner illicitly spends the same cryptocurrency token more than once. Accordingly, cryptocurrency mining forms a critical component of the blockchain ledger's maintenance and development process.

During cryptocurrency mining operations, cryptocurrency transactions are typically verified by solving a complex computational math problem. For example, during Bitcoin mining operations, a bitcoin miner attempts to come up with a 64-digit hexadecimal number (a "hash") that is equal to a target hash. The first bitcoin miner to compute the target hash or the closest value to it receives the next block of bitcoins and the process begins again. Bitcoin miners receive bitcoins as a reward for completing "blocks" of verified transactions, which are added to the blockchain.

Cryptocurrency mining operations require significant computational effort that is typically performed using specialized computing hardware and consumes large amounts of electrical energy and generates large amounts of heat. This process is also known as proof of work (PoW) and cryptocurrency mining includes engaging in this PoW activity to solve the problem and receive cryptocurrency tokens (e.g., in Bitcoins).

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

According to some aspects, a cryptocurrency mining furnace is provided. The cryptocurrency mining furnace may comprise a furnace housing, at least three separate mining computers, a transformer, and a principal fan. The furnace housing may have an air flow path extending from a housing air inlet downstream to a housing air outlet. Each mining computer may have at least one cryptocurrency mining board. Each mining computer may be positioned in the furnace housing in the air flow path upstream of the housing air outlet. The transformer may be positioned in the furnace housing upstream of the mining computers and downstream of the housing air inlet. The transformer may be electrically connected to each of the mining computers to power each of the mining computers. The principal fan may be positioned in the furnace housing in the air flow path downstream of the transformer and upstream of the mining computers to induce air flow along the air flow path through the transformer and each of the mining computers.

According to some aspects, a cryptocurrency mining furnace is provided. The cryptocurrency mining furnace may comprise a furnace housing, at least three separate mining computers, and a principal fan. The furnace housing may have an air flow path extending from a housing air inlet downstream to a housing air outlet. Each mining computer may have at least one cryptocurrency mining board. Each mining computer may be positioned in the furnace housing in the air flow path. The principal fan may be positioned in the furnace housing in the air flow path downstream of the housing air inlet and upstream of the housing air outlet to induce air flow along the air flow path through each of the mining computers. A shortest inlet air flow path length from the housing air inlet to the principal fan may be at least 200% of a shortest spatial distance between the housing air inlet and the principal fan; and a shortest outlet air flow path length from the principal fan to the housing air outlet may be at least 120% of a shortest spatial distance between the principal fan and the housing air outlet.

According to some aspects, a method of supplying heat to a building using the cryptocurrency mining furnace is provided. The method comprises operating the principal fan to induce air to flow along the air flow path, withdrawing heat from the transformer and the at least three separate mining computers into the air flowing along the air flow path to form heated air, and discharging the heated air from the housing air outlet into ducting of a building fluidly coupled to the housing air outlet.

According to some aspects, there is provided a method of inducing air flow, from a cryptocurrency mining furnace to a building, by a principal fan positioned in a furnace housing of the cryptocurrency mining furnace. The method comprises inducing air flow from a housing air inlet in the furnace housing downstream to a transformer positioned in the furnace housing. The transformer is electrically connected to at least three separate mining computers positioned in the furnace housing to power each of the mining computers. Further, the method comprises inducing air flow from the transformer downstream to the principal fan and inducing air flow from the principal fan downstream to the mining computers. Each mining computer has at least one cryptocurrency mining board. Additionally, the method comprises inducing air flow from the mining computers downstream to a housing air outlet in the furnace housing; and inducing air flow from the housing air outlet downstream to the building.

According to some aspects, there is provided a method of inducing air flow, from a cryptocurrency mining furnace to a building, by a principal fan positioned in a furnace housing of the cryptocurrency mining furnace. The method comprises inducing air flow from a housing air inlet in the furnace housing downstream to the principal fan, wherein a shortest inlet air flow path length from the housing air inlet to the principal fan is at least 200% of a shortest spatial distance between the housing air inlet and the principal fan. Further, the method comprises inducing air flow from the principal fan downstream to at least three separate mining computers positioned in the furnace housing. Each mining computer has at least one cryptocurrency mining board.

Additionally, the method comprises inducing air flow from the mining computers downstream to a housing air outlet in the furnace housing, wherein a shortest outlet air flow path length from the principal fan to the housing air outlet is at least 120% of a shortest spatial distance between the principal fan and the housing air outlet. The method also comprises inducing air flow from the housing air outlet downstream to the building.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
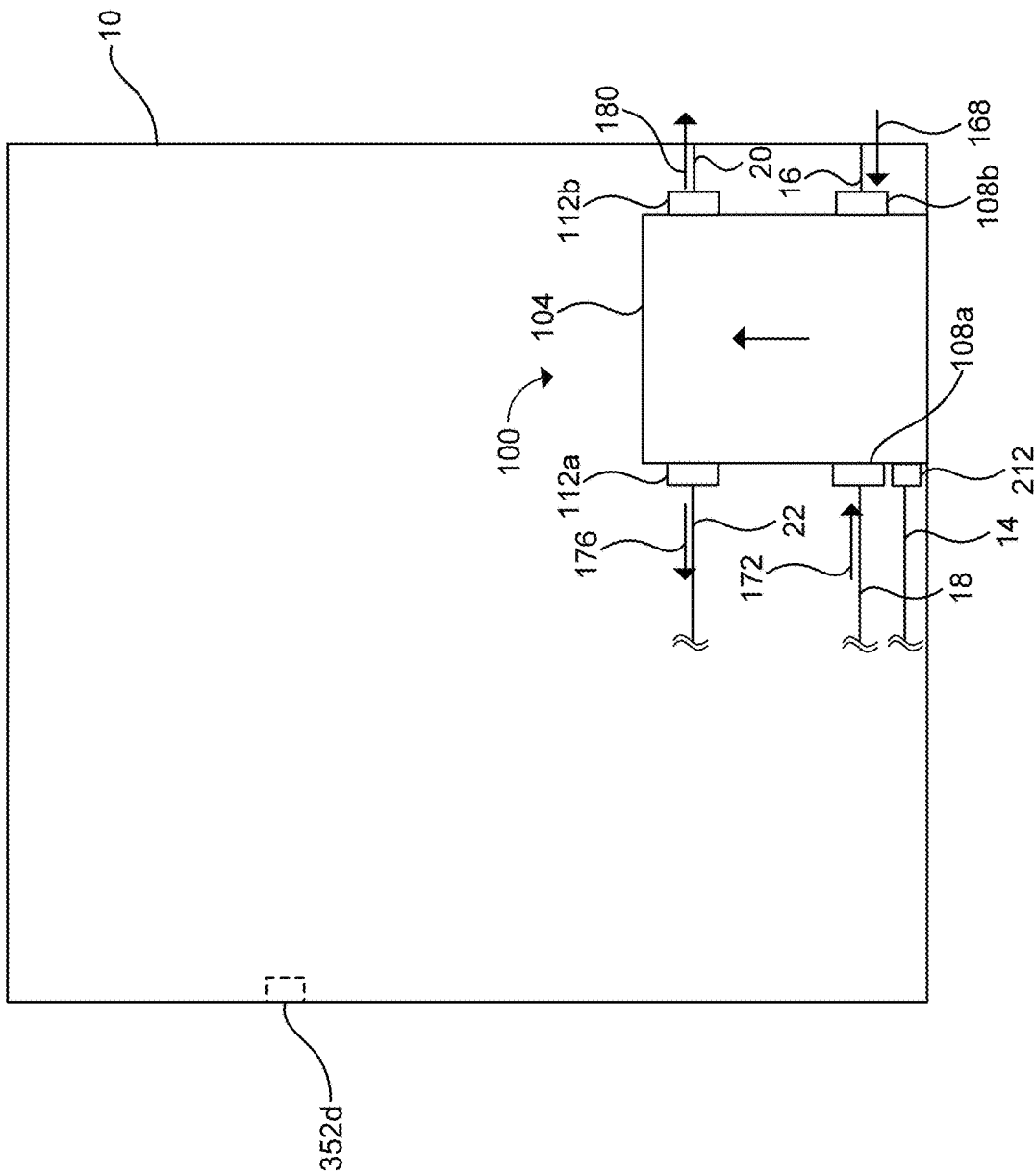
FIG. 1 is a schematic illustration of an example cryptocurrency mining furnace connected to a building, in accordance with an embodiment.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112$a$, or 112$_1$). Multiple elements herein may be identified by part numbers that share a base number in common and that differ by their suffixes (e.g., 112$_1$, 112$_2$, and 112$_3$). All elements with a common base number may be referred to collectively or generically using the base number without a suffix (e.g., 112).

As used herein and in the claims, "up", "down", "above", "below", "upwardly", "vertical", "elevation" and similar terms are in reference to a directionality generally aligned with (e.g., parallel to) gravity. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

The computing systems used for cryptocurrency mining operations can consume significant amounts of electrical energy and generate large amounts of heat energy. A cooling system can be used to dissipate the generated heat energy. Different methods may be used to dissipate the generated heat energy. For example, the cooling system can provide a cooling air flow through the computing systems of the cryptocurrency mining apparatus to transport heat energy away from the computing systems.

Described herein are apparatuses and methods that transport the heat energy generated during cryptocurrency mining operations to a building or facility. This can enable the operation of the cryptocurrency mining apparatus as a cryptocurrency mining furnace. Referring now to FIG. 1, shown therein is a schematic illustration of an example cryptocurrency mining furnace 100 fluidly coupled to a building 10. Building 10 can include any building, structure or facility used for residential, commercial, industrial, warehouse or other purposes. In some embodiments, the cryptocurrency mining furnace 100 comprises a furnace housing, a transformer, a principal fan, and multiple mining computers. Optionally, the transformer, principal fan, and multiple mining computers may all be positioned within the furnace housing.

Cryptocurrency mining furnace 100 receives electrical energy from building 10 through electrical connection 14. The transformer can step down the received voltage and provide electrical power to the principal fan and the multiple mining computers.

The multiple mining computers can consume the received electrical energy and perform cryptocurrency mining operations. Large amounts of heat energy may be generated during the cryptocurrency mining operations.

The principal fan can provide cooling to the transformer and the multiple mining computers by inducing an air flow along an air flow path through the transformer and the multiple mining computers. The air flow can transport heat energy away from the transformer and the multiple mining computers.

In FIG. 1, the induced air flow is represented schematically using directional arrows. Cool air from the environment can be induced through a housing air inlet into cryptocurrency mining furnace 100 via duct 16. The induced air can flow through the transformer and the multiple mining computers and carry away generated heat energy. The temperature of the induced air flow may increase as it removes heat energy generated by the transformer and the multiple mining computers. The resulting warmer air can be induced to flow out from a housing air outlet of cryptocurrency mining furnace 100 to building 10 via duct 22, thereby providing furnace operation for building 10. A portion of the warmer may be induced to flow out from a housing air outlet of cryptocurrency mining furnace 100 to the external environment via duct 20.

In some embodiments, cryptocurrency mining furnace 100 may provide 10-2600 kW (e.g., 50-500 kW, 70-250 kW) of heat energy to building 10 depending on the operating conditions and the cryptocurrency mining operations being performed.

Challenges associated with using cryptocurrency mining furnaces may include noise generation and power consumption of the cryptocurrency mining furnace. Noise generation challenges may relate to noise generated by furnace components like fans and/or noise generated by the air flow itself (e.g., noise generated by turbulent air flows). The described apparatuses and methods can help address these challenges. As described in greater detail herein with reference to FIGS. 2-4, cryptocurrency mining furnace 100 can include specific arrangements of the transformer, the fan and the multiple mining computers to reduce the generated noise. Cryptocurrency mining furnace 100 can also include specific geometries of the induced air flow path to reduce the generated noise. Additionally, the air flow induced by the principal fan can provide sufficient cooling for the multiple mining computers allowing them to be operated without individual, additional processor cooling fans for each mining computer. This can enable reduction of noise and power consumption associated with the individual, additional processor cooling fans.

FIG. 1 shows cryptocurrency mining furnace 100 fluidly connected to building 10. As shown, cryptocurrency mining furnace 100 may be located inside building 10. Alternatively, cryptocurrency mining furnace 100 can be located outside building 10. Additionally, FIG. 1 shows a single cryptocurrency mining furnace 100 providing furnace operations for building 10. In some embodiments, multiple cryptocurrency mining furnaces 100 (e.g., 2 to 100 cryptocurrency mining furnaces 100) may be fluidly coupled to building 10 to provide furnace operations for building 10.

The described apparatuses and methods may enable the owner of a cryptocurrency mining apparatus to harness heat energy that may otherwise be dissipated as waste energy. For example, an owner of cryptocurrency mining furnace 100 may install cryptocurrency mining furnace 100 at a building owned by a different owner. The furnace owner may pay for the cryptocurrency mining furnace 100 and the consumed electrical energy and retain the mined cryptocurrency tokens. The building owner may receive free furnace operations (i.e., heating) from the cryptocurrency mining furnace 100 in return for allowing installation of the cryptocurrency mining furnace at the building 10. In this arrangement, the advantage gained by the furnace owner is access to electrical energy. Specifically, government regulations may prohibit the furnace owner from operating a great number of cryptocurrency mining furnaces 100 at their own facility because of the burden it would place upon the electrical system. However, those regulations may not prohibit the furnace owner from distributing the same number of mining furnaces 100 among many different building owners. Synergistically, the building owners gain the benefit of free heating, which may offset the perceived wastefulness of the energy spent to mine cryptocurrency.

Figure 2:
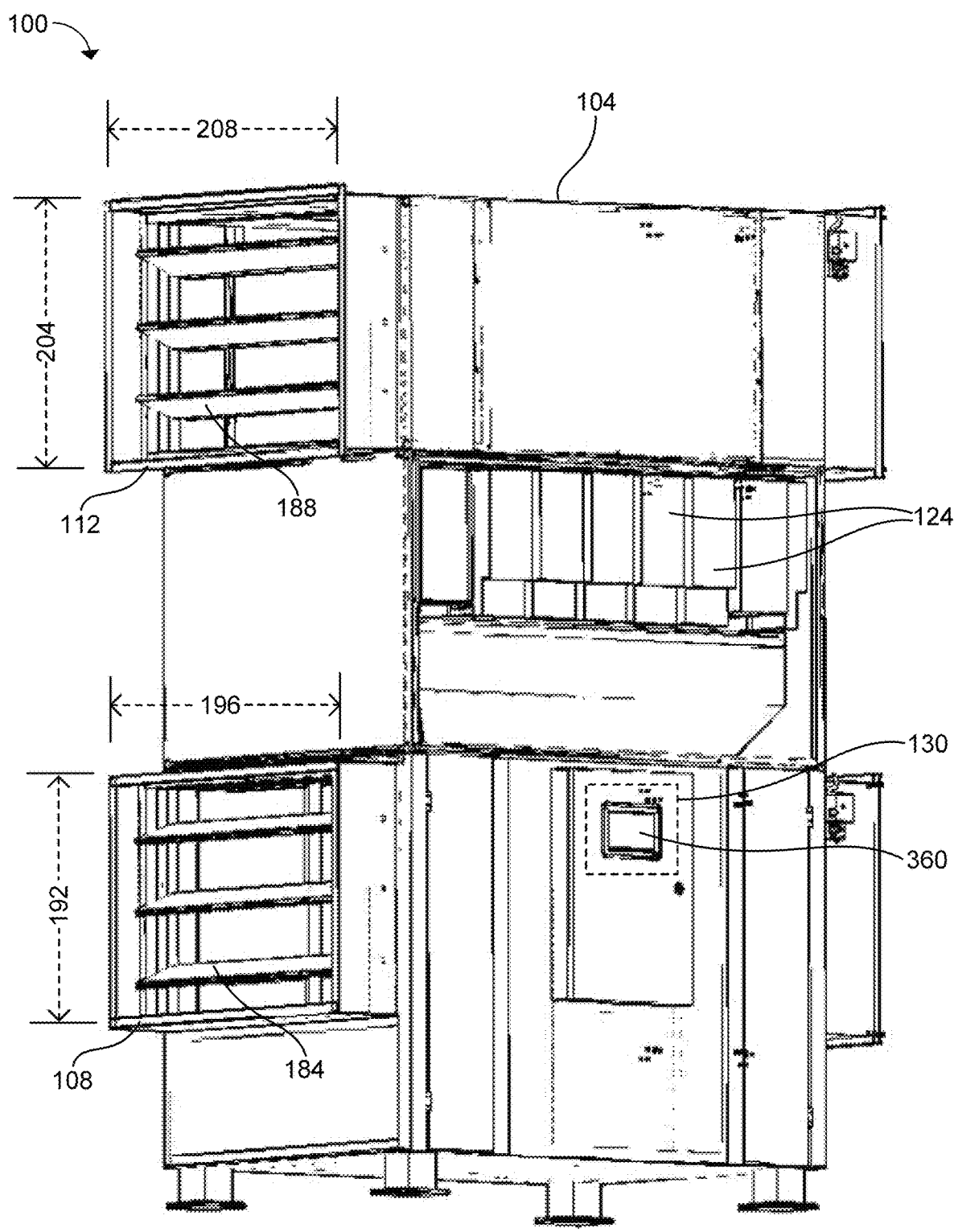
FIG. 2 is a perspective view of the cryptocurrency mining furnace of FIG. 1 with a side panel removed to reveal example mining computers of the cryptocurrency mining furnace.
Figure 3:
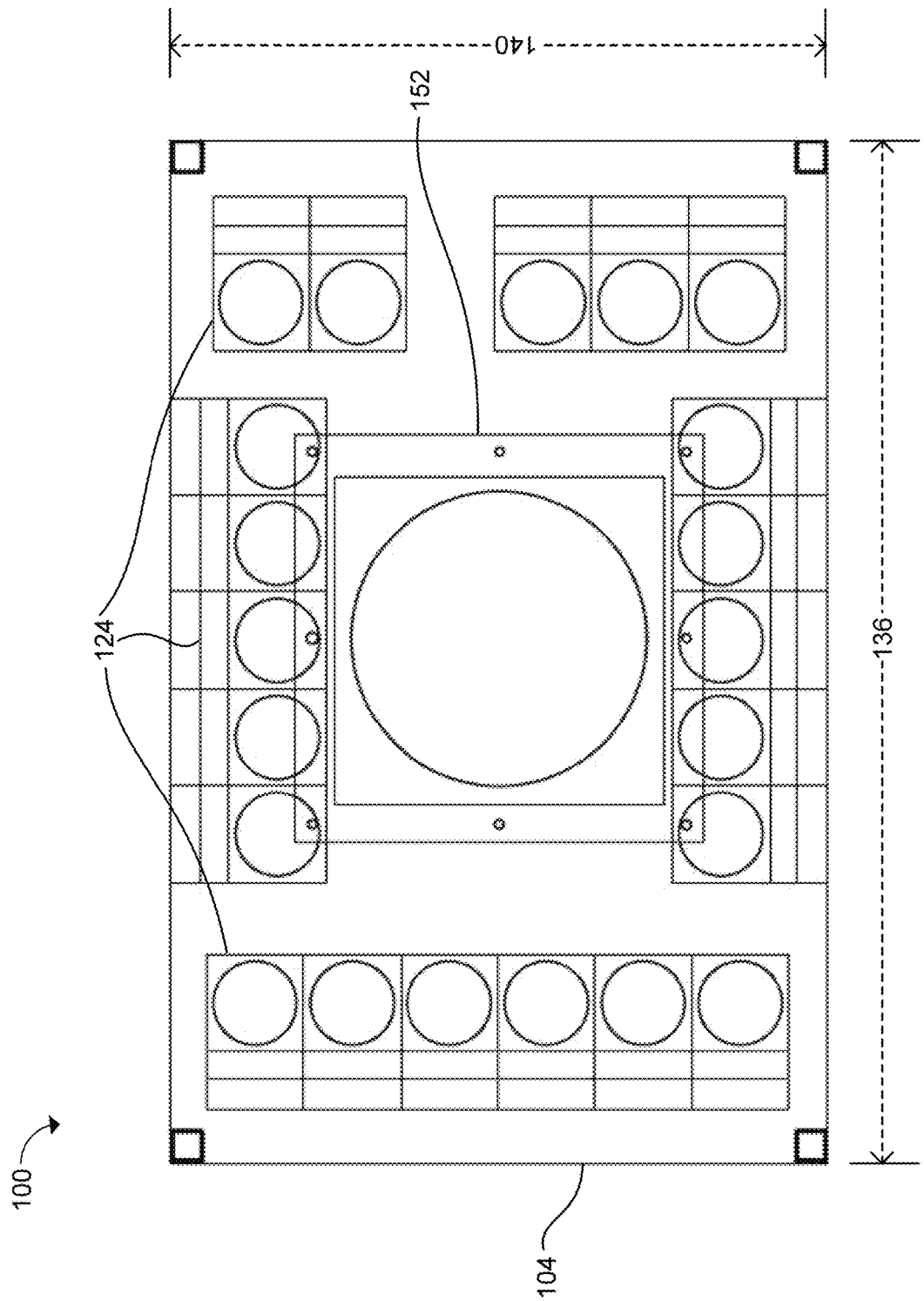
FIG. 3 is a schematic top view of the cryptocurrency mining furnace of FIG. 1.
Figure 4:
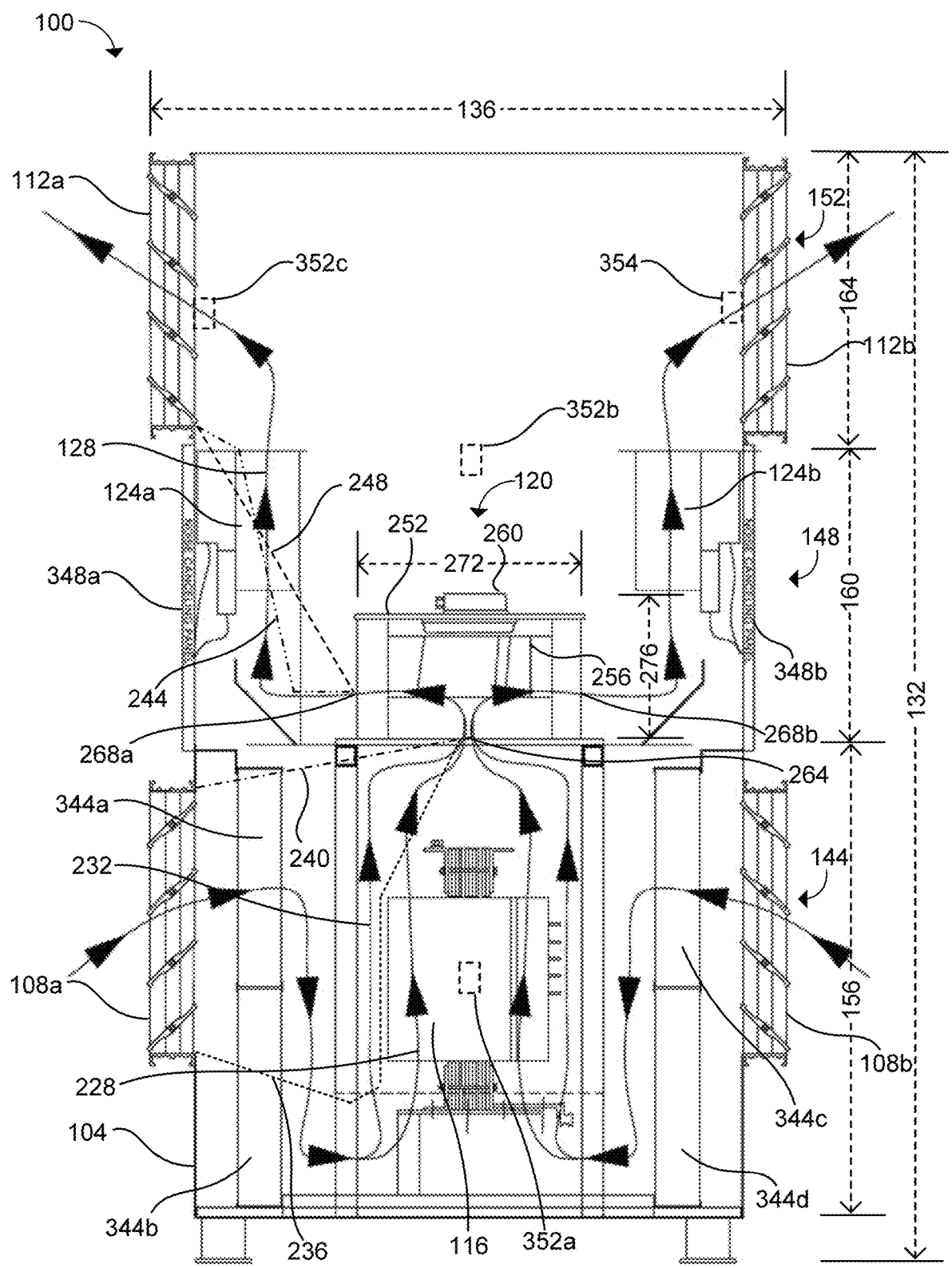
FIG. 4 is a schematic cross-sectional view of the cryptocurrency mining furnace of FIG. 1.

Referring now to FIGS. 2 to 4, shown therein are different views of cryptocurrency mining furnace 100. FIG. 2 shows a perspective view of cryptocurrency mining furnace 100, FIG. 3 shows a schematic top cross-sectional view of cryptocurrency mining furnace 100 and FIG. 4 shows a schematic front cross-sectional view of cryptocurrency mining furnace 100. As shown in FIGS. 2-4, cryptocurrency mining furnace 100 may include one or more (or all) of a furnace housing 104, a housing air inlet 108, a housing air outlet 112, a transformer 116, a principal fan 120, and mining computers 124. Furnace housing 104 may define an air flow path 128 extending downstream from housing air inlet 108 to housing air outlet 112. As shown in FIG. 4, air flow path 128 may pass through transformer 116, principal fan 120 and mining computers 124 positioned in furnace housing 104. In some embodiments, cryptocurrency mining furnace 100 may also include control device 130. In other embodiments, cryptocurrency mining furnace 100 may not include control device 130.

Furnace housing 104 may have any design that provides an enclosure suitable for housing the elements of cryptocurrency mining furnace 100. In the example shown in FIGS. 2-4, transformer 116, principal fan 120, and mining computers 124 are positioned within the enclosure of furnace housing 104. Placing all of these components within a unitary housing 104 may provide furnace 100 with a compact design and smaller footprint, all things being equal. In alternative embodiments, transformer 116 may be located external to furnace housing 104.

Furnace housing 104 can be made of any rigid material providing sufficient structural strength and integrity to support the elements of cryptocurrency mining furnace 100 positioned within furnace housing 104. In some embodiments, where cryptocurrency mining furnace 100 is located outside of building 10 in an outdoor environment, the material used to make furnace housing 104 may also be weather-resistant and capable of withstanding the outdoor environment. In some embodiments, furnace housing 104 may be made using metallic materials like steel, aluminum, or sheet metal, which may be bare, galvanized, coated, and/or painted. In other embodiments furnace housing 104 may be made using non-metallic materials. In some embodiments where cryptocurrency mining furnace 100 is located outside of building 10 in an outdoor environment, a shipping container may be repurposed as furnace housing 104.

Furnace housing 104 can be of any size suitable to house other elements of cryptocurrency mining furnace 100 including transformer 116, principal fan 120, and mining computers 124. In some embodiments, furnace housing 104 may have a height 132 of 2700 mm or less (e.g., 1500 mm-2700 mm), a width 136 of 1800 mm or less (e.g., 1000 mm-1800 mm) and a depth 140 of 1200 mm or less (e.g., 800 mm-1200 mm). A furnace of this size may provide sufficient interior space to support the other components of cryptocurrency mining furnace 100, including a sufficient number of mining computers 124 to generate a profitable amount of cryptocurrency, while also not being so big as to be difficult to ship or to become a burden for the building owner where the furnace 100 will be located. In other embodiments, one or more of the height 132, width 136 and depth 140 may be larger than 2700 mm (e.g., 2700 mm-4000 mm), 1800 mm (e.g., 1800 mm-2500 mm) and 1200 mm (e.g., 1200 mm-1600 mm) respectively. This may allow furnace housing 104 to have capacity to support a larger transformer 116 and greater number of mining computers 124.

Furnace housing 104 may include one or more sections that are fluidly coupled and collectively provide air flow path 128. For example, furnace housing 104 may include one or more (or all) of (a) a transformer section 144 including housing air inlet 108 and transformer 116; (b) a fan and miner section 148 housing principal fan 120 and mining computers 124; and (c) an exhaust section 152 housing the housing air outlet 112. For the example furnace housing shown in FIGS. 2 to 4, transformer section 144, fan and miner section 148 and exhaust section 152 are arranged vertically. In other embodiments (e.g., a shipping container repurposed as a furnace housing), transformer section 144, fan and miner section 148 and exhaust section 152 may be arranged horizontally.

In some embodiments, transformer section 144 can have a height 156 of 1200 mm or less (e.g., 700 mm-1200 mm). A transformer section of this size may provide sufficient interior space to support the other components of cryptocurrency mining furnace 100, including transformer 116, while also not being so big as to make cryptocurrency mining furnace 100 difficult to ship or to become a burden for the building owner where it will be located. In other embodiments, transformer section 144 can have a height 156 of 1200 mm or more (e.g., 1200 mm-1700 mm). This may allow transformer section 144 to have capacity to support a larger transformer 116.

In some embodiments, fan and miner section 148 can have a height 160 of 900 mm or less (e.g., 500 mm-900 mm). A fan and miner section of this size may provide sufficient interior space to support the other components of cryptocurrency mining furnace 100, including principal fan 120 and including a sufficient number of mining computers 124 to generate a profitable amount of cryptocurrency transformer 116, while also not being so big as to make cryptocurrency mining furnace 100 difficult to ship or to become a burden for the building owner where it will be located. In other embodiments, fan and miner section 148 can have a height 160 of 900 mm or more (e.g., 900 mm-1300 mm). This may allow fan and miner section 148 to have capacity to support a larger principal fan 120 and/or a greater number of mining computers 124.

In some embodiments, exhaust section 152 can have a height 164 of 700 mm or less (e.g., 300 mm-700 mm). An exhaust section of this size may provide sufficient interior space to support the other components of cryptocurrency mining furnace 100, including housing air outlet 112, while also not being so big as to make cryptocurrency mining furnace 100 difficult to ship or to become a burden for the building owner where it will be located. In other embodiments, exhaust section 152 can have a height 164 of 700 mm or more (e.g., 700 mm-1000 mm). This may allow exhaust section 152 to have capacity to support a larger housing air outlet 112.

Housing air inlet 108 may include one or more air inlets. For example, as shown in FIG. 4, cryptocurrency mining furnace 100 includes two housing air inlets 108a and 108b. In other embodiments, cryptocurrency mining furnace 100 may include greater than two (e.g., 2-8) housing air inlets. This may allow larger amounts of air to be induced into air flow path 128.

Referring now to FIGS. 1 to 4, in some embodiments, one or more housing air inlets 108 (e.g., housing air inlet 108b) can be fluidly coupled to the outdoor environment around cryptocurrency mining furnace 100 to induce exterior air flow 168 from the outdoor environment into air flow path 128. This may permit exterior cool air to be induced into air flow path 128 to provide cooling for the components within furnace housing 104. In other embodiments, none of housing air inlets 108 are fluidly coupled to the outdoor environment. In some embodiments, one or more of housing air inlets 108 can be fluidly coupled to building 10 (e.g., using duct 18) to induce interior air flow 172 from interior environment of building 10 into air flow path 128. This may permit interior warm air to be mixed with exterior air induced through an exterior-coupled inlet (e.g., housing air inlet 108b) to provide temperature control of air induced into furnace housing 104. In other embodiments, none of housing air inlets 108 are fluidly coupled to interior environment of building 10.

Housing air inlets 108 can have any design suitable for admitting air into air flow path 128. For example, housing air inlets 108 may include one or more of ducts, louvers, hood or awning assemblies. As shown in FIG. 2, housing air inlet 108 of cryptocurrency mining furnace 100 is illustrated with an inlet damper assembly 184. The inlet damper assembly 184 can have any design and size suitable for inducing the required amount of air into air flow path 128 to cool the components within furnace housing 104. In some embodiments, the inlet damper assembly 184 can have a height 192 of 15"-45" (e.g., 20"-28") and a width 196 of 15"-45" (e.g., 32"-40"). This may permit a great amount of air flow to be induced into air flow path 128 at housing air inlet 108. As one example, the inlet damper assembly 184 can be 24" high and 36" wide. In other embodiments, the height 192 of the inlet damper assembly 184 can be smaller than 15" (e.g., 10"-15") or larger than 45" (e.g., 45"-55"), and the width 196 of the inlet damper assembly 184 can be smaller than 15" (e.g., 10"-15") or larger than 45" (e.g., 45"-75"). This may permit connections to building ducts (e.g., duct 18 of building 10) of different sizes.

The inlet damper assembly 184 can be adjustable in incremental positions between an open position and a closed position. The inlet damper assembly 184 may provide greater resistance to the ingress of air through housing air inlet 108 in the closed position than in the open position. In some embodiments, inlet damper assembly 184 in the closed position may entirely inhibit airflow through housing air inlet 108. In other embodiments, inlet damper assembly 184 in the closed position may not entirely inhibit airflow through housing air inlet 108. In some embodiments, the inlet damper assembly 184 may be electronically controlled, for example, by control device 130. In other embodiments, the inlet damper assembly 184 may not be electronically controlled. For example, inlet damper assembly 184 may be manually user adjustable (i.e., by hand) to move between the open and closed position. The movements of the inlet damper assembly 184 described herein below may be automatically controlled by control device 130 (e.g., in accordance with computer-readable instructions executed by control device 130) or may be manually user performed (e.g., by hand).

In embodiments where one or more housing air inlets 108 are fluidly coupled to the interior environment of building 10 ("indoor housing air inlets") and one or more other housing air inlets 108 are fluidly coupled to the outdoor environment ("outdoor housing air inlets"), the adjustable positions of the inlet damper assemblies 184 can control the mixture of interior and outdoor air that is induced into air flow path 128. For example, in winter, spring or fall weather, the interior environment temperature of building 10 may be warmer than the outdoor environment temperature. The positions of the inlet damper assemblies 184 can be adjusted to control the mixture of interior and outdoor air that is induced into air flow path 128. To increase the proportion of outdoor air in the mixture, the inlet damper assembly 184 of the indoor housing air inlet(s) 108 may be moved towards the closed position and the inlet damper assembly 184 of the outdoor housing air inlet(s) 108 may be moved towards the open position. This can increase the proportion of outdoor air induced into air flow path 128 thereby pressurizing building 10. Pressurizing building 10 relative to the colder outdoor environment can improve comfort levels for human occupants of building 10 by reducing cold drafts and resulting cold zones caused by air leaks in building 10.

In some embodiments, the temperature of the air induced into air flow path 128 may range between −40° C. to 40° C. For example, the inlet damper assemblies 184 may be adjusted to control the temperature of the air induced into air flow path 128 to be greater than 0° C., such as 0° C.-10° C. (e.g., 2° C.-5° C.) in winter weather. This may mitigate problems with condensation forming on the components within furnace housing 104. In summer, spring and fall weather, the inlet damper assemblies 184 may be adjusted to close the fluid coupling with the interior environment of building 10. For example, whenever the outdoor air is warmer than the indoor air of building 10, or whenever the outdoor air is warmer than a prescribed temperature (e.g., 5° C., 10° C., or 15° C.), the inlet damper assemblies of indoor housing air inlets 108 may be closed. Accordingly, the temperature of the air induced into air flow path 128 may correspond to temperature of the outdoor environment around cryptocurrency mining furnace 100. This may avoid burdening the building 10 with the cost of cooling the components within cryptocurrency mining furnace 100.

Cryptocurrency mining furnace 100 may include one or more housing air outlets 112. For example, as shown in FIG. 4, cryptocurrency mining furnace 100 includes two housing air outlets 112a and 112b. In other embodiments, cryptocurrency mining furnace 100 may include greater than two (e.g., 2-8) housing air outlets. This may allow larger amounts of air to be induced out of furnace housing 104.

In some embodiments, one or more of housing air outlets 112 can be fluidly coupled to building 10 (e.g., using duct 22) to induce air flow 176 from cryptocurrency mining furnace 100 to interior environment of building 10. This may permit warm air from cryptocurrency mining furnace 100 to be induced into interior environment of building 10 to provide heating for building 10. In some embodiments, one or more housing air outlets 112 (e.g., housing air outlet 112b) can be fluidly coupled to the outdoor environment around cryptocurrency mining furnace 100 to induce air flow 180 from cryptocurrency mining furnace 100 to the outdoor environment. This may permit diversion of some of the warm air from cryptocurrency mining furnace 100 to the outdoor environment when only a portion (or none) of the warm air from cryptocurrency mining furnace 100 is required for heating building 10. In other embodiments, none of housing air outlets 112 are fluidly coupled to the outdoor environment around cryptocurrency mining furnace 100.

Housing air outlets 112 can have any design suitable for inducing air flow out of air flow path 128. For example, housing air outlets 112 may include one or more of ducts, louvers, hood or awning assemblies. As shown in FIG. 2, housing air outlet 112 of cryptocurrency mining furnace 100 includes an outlet damper assembly 188. The outlet damper assembly 188 can have any design and size suitable for inducing the required amount of air out of air flow path 128. In some embodiments, the outlet damper assembly 188 can have a height 204 of 15"-45" (e.g., 20"-28") and a width 208 of 15"-45" (e.g., 32"-40"). This may permit a great amount of air flow to be induced from air flow path 128 at housing air outlet 112. As one example, the outlet damper assembly 188 can be 24" high and 36" wide. In other embodiments, the height 204 of the outlet damper assembly 188 can be smaller than 15" (e.g., 10"-15") or larger than 45" (e.g., 45"-55"), and the width 208 of the outlet damper assembly 188 can be smaller than 15" (e.g., 10"-15") or larger than 45" (e.g., 45"-55"). This may permit connections to building ducts (e.g., duct 22 of building 10) of different sizes.

The outlet damper assembly 188 can be adjustable in incremental positions between an open position and an air flow shutoff position. The outlet damper assembly 188 may provide greater resistance to the egress of air through housing air outlet 112 in the closed position than in the open position. In some embodiments, outlet damper assembly 188 in the closed position may entirely inhibit airflow through housing air outlet 112. In other embodiments, outlet damper assembly 188 in the closed position may not entirely inhibit airflow through housing air outlet 112. In some embodiments, the outlet damper assembly 188 may be electronically controlled, for example, by control device 130. In other embodiments, the outlet damper assembly 188 may not be electronically controlled. For example, outlet damper assembly 188 may be manually user adjustable (i.e., by hand) to move between the open and closed position. The movements of the outlet damper assembly 188 described herein below may be automatically controlled by control device 130 (e.g., in accordance with computer-readable instructions executed by control device 130) or may be manually user performed (e.g., by hand).

The air flow induced out of air flow path 128 at housing air outlet 112 may transport heat energy away from transformer 116 and mining computers 124 and the air temperature may be warmer compared with the temperature of air flowing in at air inlet 108. The temperature of air flow out of housing air outlet 112 ("air outlet temperature") may depend on various factors including the temperature of air at housing air inlet 108, amount of air principal fan 120 propels through air flow path 128 (propelled by principal fan 120), and the amount of heat energy generated by transformer 116 and mining computers 124. In some embodiments, the air outlet temperature may be greater than 40° C. Alternatively, or in addition, the difference in air temperature ("delta air temperature") between air induced into air flow path 128 at an exterior-coupled inlet and the air outlet temperature may be greater than 20 degrees (i.e., outlet temperature minus inlet temperature is greater than 20 degrees). An air outlet temperature of greater than 40° C. and/or a delta air temperature of greater than 20° C. may be advantageous because air of this temperature can have utility for use as heating for climate control in a building 10. Further, an outlet temperature of greater than 40° C. and/or a delta air temperature of greater than 20° C. may indicate that principal fan 120 is not generating excessive flow rate (e.g., in CFM) through air flow path 128. For example, an indication that principal fan 120 is undersized or running too hard—and thereby producing excessive noise and consuming excessive energy—may include that the air outlet temperature is less than 40° C. (while mining computers are running at load) and/or a delta air temperature of less than 20° C.

Alternatively, or in addition, the air outlet temperature may be less than 60° C. (e.g., 30° C. -60° C.). An air outlet temperature of less than 60° C. may provide safety in that it is unlikely to cause injury (e.g., burns) in the event that the outlet air impinges on a bystander. An air outlet temperature of less than 60° C. may also be compliant with certain types of ducting and ducting accessories and peripherals, which can be damaged by excessive temperature.

In alternative embodiments, the air outlet temperature may be lower than 40° C. and/or a delta air temperature may be less than 20° C. (e.g., 5° C. -20° C.). This may indicate that the temperature of the equipment (e.g., transformer 116 and mining computers 124) in the air flow path 128 have been greatly reduced, which may allow them to run more efficiently or at higher load. In other embodiments, the air outlet temperature may be greater than 60° C. and/or the delta air temperature may be greater than 30° C. This may allow cryptocurrency mining furnace 100 to supply very hot air to support processes (e.g., manufacturing or industrial processes) within a building 10 that requires air of this temperature.

In embodiments including at least one additional housing air outlet 112 fluidly coupled to the outdoor environment, the adjustable positions of the outlet damper assemblies 188 can control the exhaust ratio of quantity of warm air flowing out of interior-coupled outlets (e.g., housing air outlet 112a to building 10) to the quantity of warm air flowing out of exterior-coupled outlets (e.g., housing air outlet 112b to the outdoor environment). For example, if higher heating is required for building 10, the outlet damper assembly 188 at housing air outlet 112a coupled to the interior environment of building 10 may be moved towards the open position to increase the quantity of warm air flowing out to building 10. The outlet damper assembly 188 at housing air outlet 112b coupled to the outdoor environment may be moved towards the closed position to reduce the quantity of warm air flowing out to the outdoor environment.

In another example, if reduced heating is required for building 10, the outlet damper assembly 188 at housing air outlet 112a coupled to the interior environment of building 10 may be moved towards the closed position to reduce the quantity of warm air flowing out to building 10. The outlet damper assembly 188 at housing air outlet 112b coupled to the outdoor environment may be moved towards the open position to increase the quantity of warm air flowing out to the outdoor environment.

Cryptocurrency mining furnace 100 may include at least one transformer 116 positioned within furnace housing 104 in air flow path 128. In some embodiments, transformer 116 may be positioned in air flow path 128 downstream of housing air inlet 108 and upstream of mining computers 124.

Transformer 116 can have any design suitable for receiving electrical power supply from building 10 (e.g., through electrical connection 14) and distributing the received electrical energy to other elements of cryptocurrency mining furnace 100. In some embodiments, a power meter 212 may be positioned at electrical connection 14 to measure the power consumed by cryptocurrency mining furnace 100. In other embodiments, a power meter may not be positioned at electrical connection 14. Transformer 116 can be electrically connected to provide electrical power to the other elements of cryptocurrency mining furnace 100 including principal fan 120 and mining computers 124.

In some embodiments, transformer 116 can be a voltage step-down transformer. For example, transformer 116 can receive 600V input voltage and provide stepped-down output voltage (e.g., 416V L-L / 240V L-N). Transformer 116 can enable transmission of input electrical energy to cryptocurrency mining furnace 100 at a higher voltage resulting in reduced current and reduced $I^2R$ heat energy loss during transmission. Transformer 116 can also enable provision of electrical energy at the stepped-down voltage that is compatible with the electrical components of cryptocurrency mining furnace 100. In other embodiments, transformer 116 may not be a voltage step-down transformer.

Transformer 116 can have any nominal power rating suitable for providing sufficient power to one or more (or all) of the electrical components of cryptocurrency mining furnace 100. For example, transformer 116 can have nominal power rating of 50-112.5 kVA. This may permit transformer 116 to provide sufficient power for principal fan 120 to induce required amount of air flow through air flow path 128 and for mining computers 124 to mine a profitable amount of cryptocurrency, while also not being so big as to be difficult to ship or to become a burden for the building owner where the cryptocurrency mining furnace 100 will be located. As described herein below, transformer 116 may operate at higher power ratings when forced cooling of transformer 116 is provided. This may permit usage of transformer 116 with lower nominal power rating (e.g., 75 kVA) that may be less expensive, smaller, and lighter than a transformer 116 with higher nominal power rating (e.g., 112.5 kVA), all else being equal.

Figure 5:
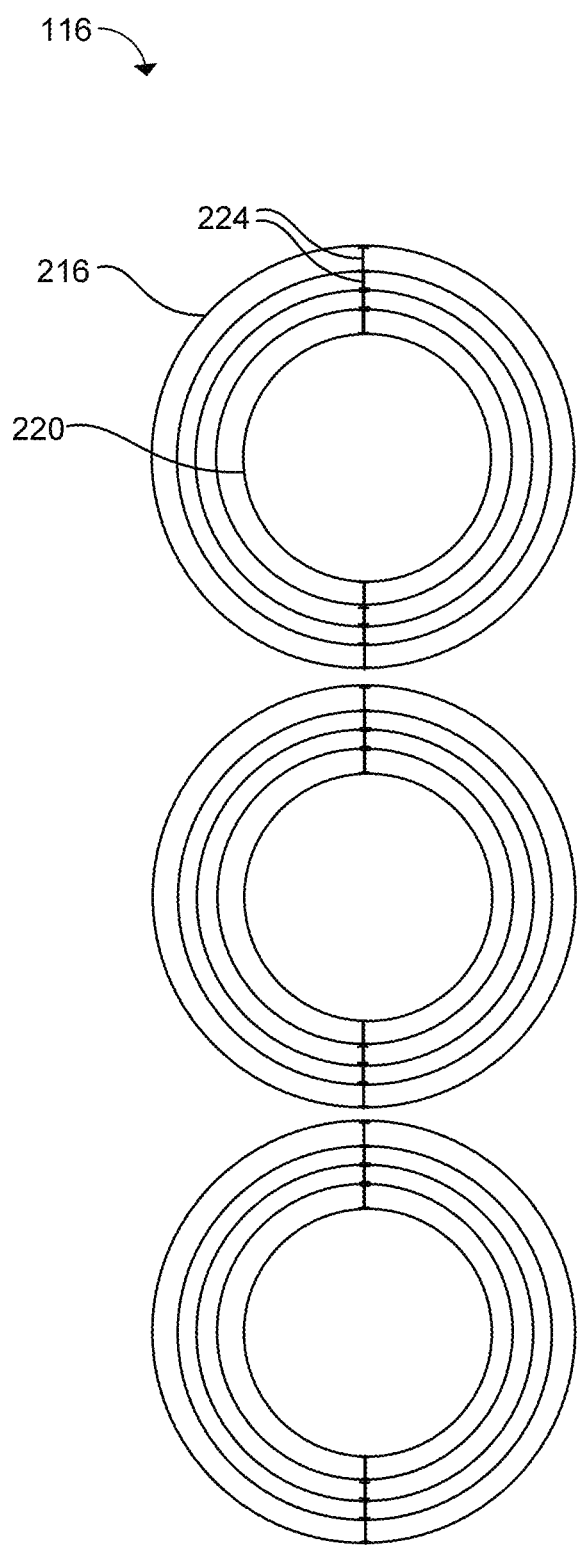
FIG. 5 is a schematic top view of an example transformer of the cryptocurrency mining furnace of FIG. 1.

In some embodiments, transformer 116 can be a forced air-cooled transformer that includes one or multiple cooling ducts between sections of the transformer windings that allow forced air to pass through the transformer windings. Referring now to FIG. 5, shown therein is a schematic top view of a portion of transformer 116. As shown in FIG. 5, three-phase transformer 116 may comprise three sets of winding 216, core 220 and multiple cooling ducts 224. Cooling ducts 224 can have any design suitable for providing a pathway for forced air to pass between the turns of winding 216. This can permit induced air flow of air flow path 128 to transport away heat energy generated by transformer 116. The forced air-cooling may enable transformer 116 to operate at higher power ratings. For example, when forced air-cooled, transformer 116 may be safely operated at 110-150% (e.g., 110-130%, such as 115-125%) of the nominal power rating of transformer 116. In one example, a forced air-cooled transformer having a nominal power rating of 75 kVA may safely operate at up to 90 kVA when forced air-cooled as described herein. For example, three-phase transformers may be manufactured in National Electrical Manufacturers Association (NEMA) standard sizes of 3, 6, 9, 15, 30, 45, 75, 112.5, 150, 225, and 300 kVA. The operation of a 75 kVA transformer at the nominal load of 83 kVA can avoid the requirement for a 112.5 kVA transformer. In some embodiments, transformer 116 may be capable of operation at power ratings higher than 90 kVA (e.g., 90 kVA-120 kVA). This may permit installation of a larger number of mining computers 124 in cryptocurrency mining furnace 100 without the need for additional space for a larger transformer or the associated extra cost.

Referring back to FIGS. 1 to 4, the induced air flow of air flow path 128 can provide air-cooling of transformer 116 and may enable transformer 116 to operate at higher power ratings. As shown in FIG. 4, air flow path 128 may comprise a primary air flow path 228 and a secondary air flow path 232. Primary air flow path 228 can include the portion of the induced air flow of air flow path 128 that runs through transformer 116 and provides forced air-cooling. Secondary air flow path 232 can include the remaining portion of the induced air flow that extends around the exterior of transformer 116 and runs in parallel to primary air flow path 144. In some embodiments, primary air flow path 228 may include 5-15% of the induced air flow of air flow path 128 and secondary air flow path 232 may include the remaining 85-95% of the induced air flow of air flow path 128. This may enable sufficient cooling for safe and efficient operation of transformer 116 while enabling a large portion of the induced air flow to flow through the lower resistance path, i.e., secondary air flow path 232. In other embodiments, primary air flow path 228 may include less than 5% (e.g., 1%-5%) of the induced air flow of air flow path 128 with secondary air flow path 232 including the remaining portion (e.g., 95%-99%) of the induced air flow. This may enable more efficient operation of cryptocurrency mining furnace 100 by enabling a larger portion of the induced air flow to flow through the lower resistance path, i.e., secondary air flow path 232. In other embodiments, primary air flow path 228 may include greater than 15% (e.g., 15%-20%) of the induced air flow of air flow path 128 with secondary air flow path 232 including the remaining portion (e.g., 75%-80%) of the induced air flow. This may enable higher amount of forced air-cooling of transformer 116 thereby permitting transformer 116 to be operated at higher nominal power ratings.

In some embodiments, transformer 116 may not be a forced air-cooled transformer. For example, transformer 116 may include a different method of cooling and air flow path 128 may not include primary air flow path 228 (e.g., all of the induced air flow of air flow path 128 may flow through secondary air flow path 232). This may permit operation of principal fan 120 at lower speeds for identical mining operations, all else being equal. In another example, transformer 116 may be located outside of furnace housing 104. This may permit furnace housing 104 to be smaller and lighter, all else being equal.

Cryptocurrency mining furnace 100 may include at least one principal fan 120 positioned within furnace housing 104 in air flow path 128. Principal fan 120 can have any design suitable for inducing air flow along air flow path 128 from housing air inlet 108 to housing air outlet 112 and through transformer 116 and mining computers 124.

In the illustrated example, cryptocurrency mining furnace 100 includes a single principal fan 120. Specifically, principal fan 120 can be the only fan in furnace housing 104 located upstream or downstream of mining computers 124. As compared to several smaller fans of equal combined fan power, the single principal fan may have larger blades that spin slower and may generate less noise (and lower pitched noise) and operate more efficiently.

In some embodiments, principal fan 120 may be positioned in air flow path 128 downstream of transformer 116 and upstream of mining computers 124. The relative positioning of principal fan 120 with respect to housing air inlet 108, housing air outlet 112, transformer 116 and mining computers 124 may help reduce noise generated by air flow along air flow path 128.

A shortest inlet air flow path length 236 from housing air inlet 108 to principal fan 120 can be the shortest path length from any inlet position on housing air inlet 108 to where air enters principal fan 120 along air flow path 128. A shortest spatial distance 240 between housing air inlet 108 and principal fan 120 can be the shortest 3-dimensional linear distance from any point where air enters housing air inlet 108 to any position where air enters principal fan 120. In some embodiments, principal fan 120 is relatively positioned with respect to housing air inlet 108 such that the shortest inlet air flow path length 236 is at least 200% (e.g., 200%-600%) of the shortest spatial distance 240. This may enable reduction in noise generated by air flow along air flow path 128 compared with a design where the shortest inlet air flow path length 236 is less than 200% of the shortest spatial distance 240. For example, the shortest inlet air flow path length 236 can be 1400 mm and the shortest spatial distance 240 can be 700 mm. In other embodiments, principal fan 120 is relatively positioned with respect to housing air inlet 108 such that the shortest inlet air flow path length 236 is from 100% to 200% of the shortest spatial distance 240. This may enable a smaller, lighter, and more compact design for furnace housing 104.

A shortest outlet air flow path length 244 from principal fan 120 to housing air outlet 112 can be the shortest path length from where air exits principal fan 120 to any outlet position on housing air outlet 112 along air flow path 128. A shortest spatial distance 248 between principal fan 120 and housing air outlet 112 can be the shortest 3-dimensional linear distance from any point where air exits principal fan 120 to any point where air exits housing air outlet 112. In some embodiments, principal fan 120 is relatively positioned with respect to housing air outlet 112 such that the shortest outlet air flow path length 244 is at least 120% (e.g., 120%-600%) of the shortest spatial distance 248. This may enable reduction in noise generated by air flow along air flow path 128 compared with a design where the shortest outlet air flow path length 244 is less than 120% of the shortest spatial distance 248. In other embodiments, principal fan 120 is relatively positioned with respect to housing air outlet 112 such that the shortest outlet air flow path length 244 is from 100% to 120% of the shortest spatial distance 248. This may enable a smaller, lighter, and more compact design for furnace housing 104. In some embodiments, principal fan 120 is relatively positioned with respect to housing air outlet 112 such that the shortest outlet air flow path length 244 is from 120% to 200% of the shortest spatial distance 248. This may enable higher noise reduction, but at the cost of a larger and heavier design.

Principal fan 120 may include a fan housing 252, a fan impeller 256 and an impeller motor 260. In some embodiments, principal fan 120 may be a centrifugal backwards curved fan that may provide significant energy savings compared with other designs. In other embodiments, principal fan 120 may not be a centrifugal backwards curved fan. For example. a different fan design may be used because of size or cost constraints.

In some embodiments, principal fan 120 can provide induced air flow along air flow path 128 in any amount suitable to provide adequate cooling for the other components within furnace housing 104 in a range from 3000-7500 CFM. This may permit sufficient cooling of components including transformer 116 and mining computers 124. In other embodiments, principal fan 120 may provide induced air flow lower than 3000 CFM (e.g., 1000 CFM-3000 CFM). This may permit operation of principal fan 120 at lower speeds thereby reducing total power consumption of cryptocurrency mining furnace 100. In other embodiments, principal fan 120 may provide induced air flow higher than 7500 CFM (e.g., 7500 CFM-30,000 CFM). This may permit operation of higher number of mining computers 124 in cryptocurrency mining furnace 100.

Principal fan 120 may have any number of fan impellers 256. In some embodiments, principal fan 120 may include a single fan impeller 256. In some embodiments, larger and higher power cryptocurrency mining furnaces 100 may include larger number of fan impellers. For example, a 225 kW cryptocurrency mining furnace 100 may include three fan impellers 256. In other embodiments, cryptocurrency mining furnaces 100 may include greater than three fan impellers 256 (e.g., 4 to 6) for providing higher power operation.

The fan impeller 256 can have any design suitable to induce the required air flow along air flow path 128. In some embodiments, the fan impeller 256 may be at least 300 mm (e.g., 350 mm-1000 mm, such as 450 mm) in diameter. The large size of fan impeller 256 may enable principal fan 120 to provide the same air flow (CFM) while operating at slower speed (RPM) compared with principal fans 120 including a smaller fan impeller. The slower RPM speed may enable lower noise generation (and lower pitched noise) compared with principal fans 120 including a smaller fan impeller. In other embodiments, the fan impeller 256 may be smaller than 300 mm (e.g., 200 mm-300 mm) in diameter. This may permit furnace housing 104 to be smaller and lighter. In other embodiments, the fan impeller 256 may be larger than 1000 mm in diameter. This may permit larger air flows (CFM) while operating at slow RPM speeds.

Principal fan 120 may include at least one impeller motor 260 that drives the fan impeller 256 at variable speeds. The impeller motor 260 may receive electrical energy from transformer 116. In some embodiments, the impeller motor may have any design suitable for driving the fan impeller 256 such as an AC induction motor, DC brushed motor, or an electronically commutated (EC) motor. In the illustrated example, impeller motor 260 is an EC motor. The EC motor may provide more energy-efficient operation compared with AC induction motors and DC brushed motors. In other embodiments, the impeller motor may not be an EC motor. For example, a different motor may be used based on cost constraints.

Fan housing 252 may include a fan housing air inlet 264 and a fan housing air outlet 268. Fan housing 252 can have any size suitable to house the fan impeller 256 and the impeller motor 260. In some embodiments, fan housing 252 may have an outside dimension 272 in a range from 550 mm-1200 mm. For an example embodiment including a 450 mm diameter fan impeller 256, fan housing 252 may have an outside dimension 272 of 630 mm. In other embodiments, fan housing 252 may have an outside dimension smaller than 550 mm (e.g., 450 mm-550 mm) or larger than 1200 mm (e.g., 1200 mm-1300 mm) depending on the size of the fan impeller 256 and the impeller motor 260. In some embodiments, fan housing 252 may have a height 276 in a range from 300 mm-800 mm. This may permit sufficient housing space to house fan impeller 256 and impeller motor 260. For the example shown in FIGS. 2-4, fan housing 252 may have a height 276 of 484 mm. In other embodiments, fan housing 252 may be smaller than 300 mm (e.g., 250 mm-300 mm) in height. This may permit a smaller and lighter furnace housing 104. In other embodiments, fan housing 252 may be larger than 800 mm in height (e.g., 800 mm-900 mm). This may permit fan housing 252 to house larger fan impeller 256 or impeller motor 260.

Principal fan 120 can operate at different speeds depending on the induced air flow requirements of cryptocurrency mining furnace 100. In some embodiments, principal fan 120 may operate at speeds less than 4000 RPM (e.g., in a speed range from 1000-2500 RPM). The operating speed of principal fan 120 can be much lower than the operating speeds that would be required for smaller fans with a combined equivalent induced air flow (CFM). The lower operating speed may enable principal fan 120 to generate less noise and lower pitched noise compared with the smaller fans. As an example, principal fan 120 may operate at a lower speed of 1000 RPM during winter weather when the temperature of the air induced into air flow path 128 at housing air inlet 108 is lower compared with summer weather. Principal fan 120 may operate at a higher speed of 2000 RPM during summer weather. In other embodiments, principal fan 120 may operate at speeds lower than 1000 RPM (e.g., 500-1000 RPM). This may enable lower noise generation during operation of cryptocurrency mining furnace 100. In other embodiments, principal fan 120 may operate at speeds higher than 2500 RPM (e.g., 2500-4500 RPM). This may permit principal fan 120 to generate larger amounts of induced air flow into air flow path 128. In some embodiments, the operating speed of principal fan 120 may be controlled by control device 130. In other embodiments, the operating speed of principal fan 120 may not be controlled by control device 130. For example, the operating speed of principal fan 120 may be controlled by an independent circuit, e.g., a circuit using a temperature input signal to control the operating speed of principal fan 120.

The power consumption of principal fan 120 may vary based on the variable operating speeds of principal fan 120. In some embodiments, the average power consumption of principal fan 120 may vary from 0.5 kW to 4.5 kW. For example, the average power consumption of principal fan 120 can be 0.75 kW during winter weather when the temperature of the air induced into air flow path 128 at housing air inlet 108 is 0° C. The average power consumption of principal fan 120 can be 2.83 kW during summer weather when the temperature of the air induced into air flow path 128 at housing air inlet 108 is 25° C. The average power consumption of principal fan 120 can be 4 kW during summer weather when the temperature of the air induced into air flow path 128 at housing air inlet 108 is 40° C. In other embodiments, the average power consumption of principal fan 120 may be different under identical operating conditions.

Cryptocurrency mining furnace 100 may include at least three separate mining computers 124 positioned within furnace housing 104 in air flow path 128. For example, cryptocurrency mining furnace 100 may include 3-1500 mining computers 124 (e.g., 15-768 mining computers 124, such as 15-60 mining computers 124). In the illustrated example there are 21 separate mining computers 124. In some embodiments that use a three-phase transformer to power the mining computers, the total number of mining computers 124 may be a multiple of three to balance the load on each phase.

Mining computers 124 can have any design suitable for performing cryptocurrency mining operations. In some embodiments, mining computers 124 may belong to the Whatsminer® series of mining computers. For example, the mining computers may belong to the M20, M30 or M50 series of Whatsminer® mining computers. In other embodiments, mining computers 124 may not belong to the Whatsminer® series of mining computers.

Figure 6:
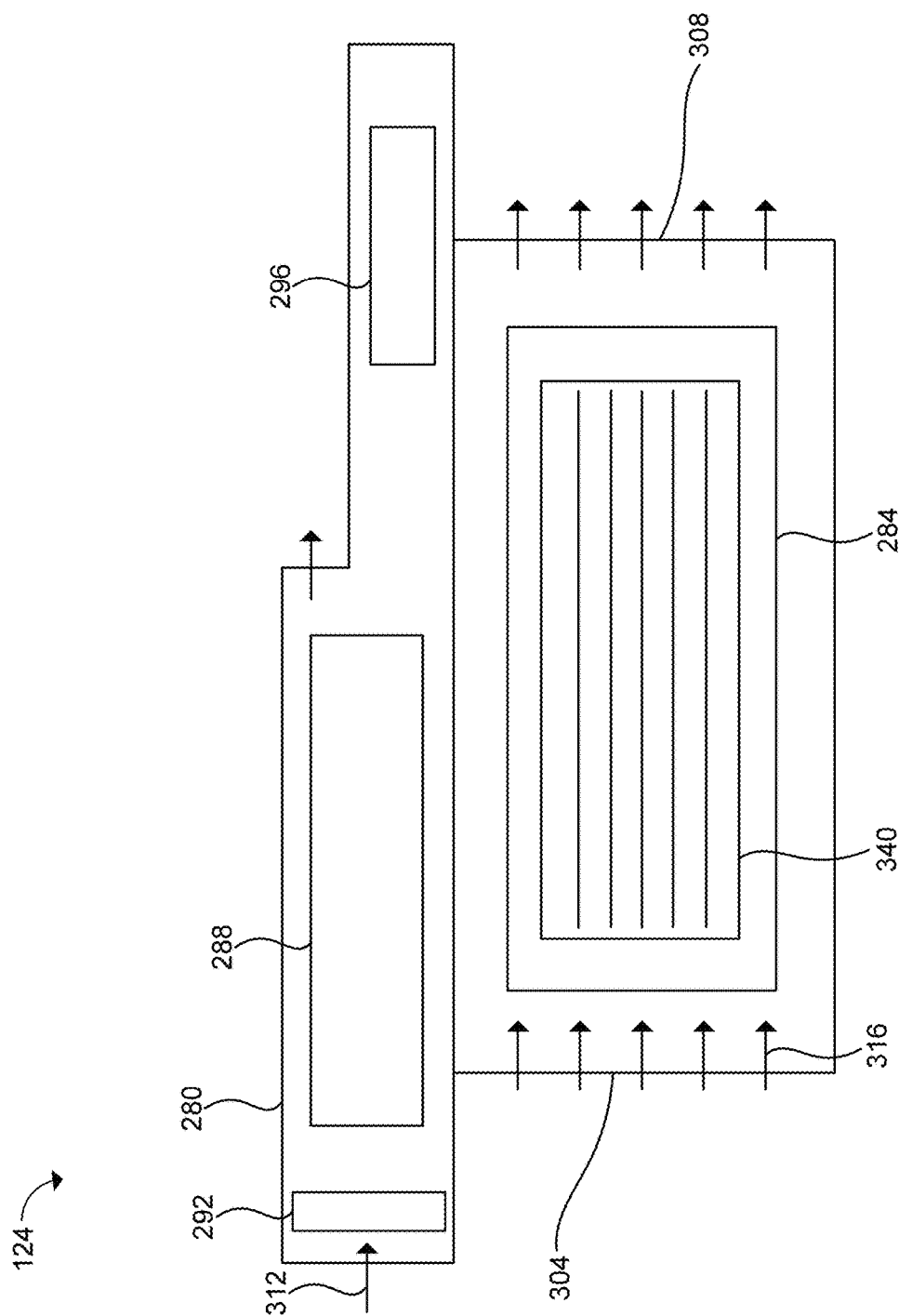
FIG. 6 is a schematic illustration of a mining computer adapted for use in the cryptocurrency mining furnace of FIG. 1.

Referring now to FIG. 6, shown therein is a schematic illustration of an example mining computer 124 adapted for use in cryptocurrency mining furnace 100. As shown in FIG. 6, mining computer 124 may include one or more (or all) of a computer housing 280, a cryptocurrency mining board 284, a computer power supply 288, a power supply fan 292 and a computer control board 296.

Computer control board 296 can have any design suitable for controlling various operations of mining computer 124. In some embodiments, computer control board 296 may control various operations of cryptocurrency mining board 284, computer power supply 288 and power supply fan 292. For example, computer control board 296 may control the mining operations of cryptocurrency mining board 284. In some embodiments, computer control board 296 may also enable network communication for mining computer 124 to communicate with external devices and servers during the cryptocurrency mining operations.

In some embodiments, computer control board 296 may not be in communication with control device 130. In other embodiments, computer control board 296 may be in communication with control device 130. Control device 130 may provide instructions to control cryptocurrency mining operations performed by mining computer 124.

Computer power supply 288 can have any design suitable for providing power supply to different components of mining computer 124 including one or more (or all) of cryptocurrency mining board 284, power supply fan 292 and computer control board 296. Computer power supply 288 may receive input power supply from transformer 116. In some embodiments, computer power supply 288 may receive 240V AC input power supply from transformer 116 and provide suitable DC output power supply to one or more (or all) of cryptocurrency mining board 284, power supply fan 292 and computer control board 296. In some embodiments, computer power supply 288 may receive greater than or less than 240V AC input power supply from transformer 116 (e.g., 200V-240V, 240V-300V). For example, computer power supply 288 may receive 277V AC input power supply from transformer 116 to enable overclocked operation of mining computer 124.

Figure 7:
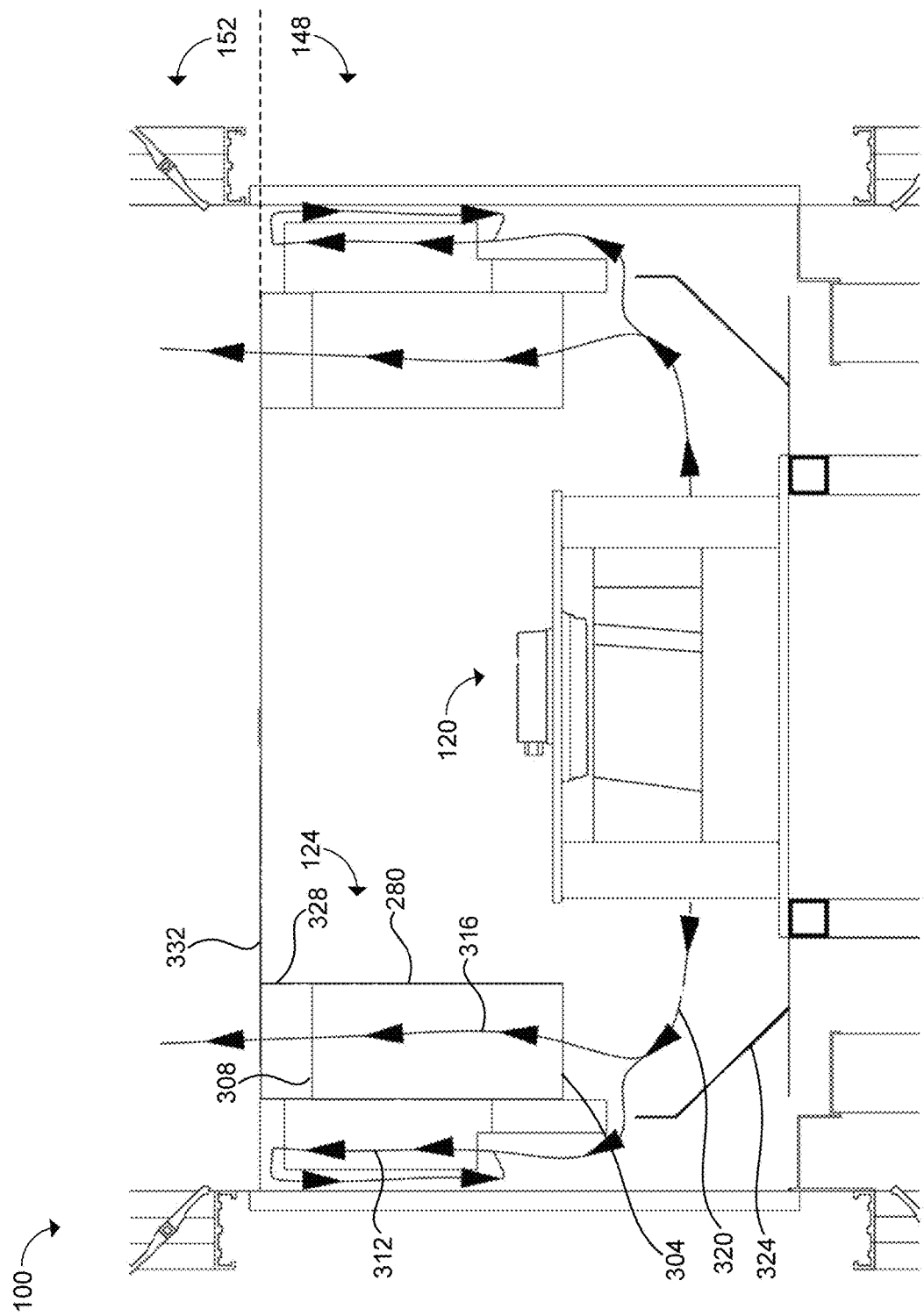
FIG. 7 is a schematic illustration of air flows through the example mining computer of FIG. 6 positioned in the cryptocurrency mining furnace of FIG. 1.

Power supply fan 292 can have any design suitable for providing air cooling of computer power supply 288. Referring now to FIGS. 6 and 7, shown therein is a schematic illustration of air flows through mining computer 124 positioned within the furnace housing of cryptocurrency mining furnace 100. The directional arrows in FIGS. 6 and 7 indicate the direction of induced air flows. Power supply fan 292 may induce air flow 312 to provide cooling for computer power supply 288. The air flow induced by the principal fan may cause the power supply fans 292 to overspeed and generate loud, high-frequency noise. Accordingly, in some embodiments, power supply fan 292 may be positioned outside of air flow path 128 and may not induce air flow along air flow path 128. Accordingly, power supply fan 292 may not provide any air flow through any cryptocurrency mining boards 284 located in air flow path 128. For example, as shown in FIG. 7, air flow 312 may comprise air entering from fan and miner section 148, transporting heat away from computer power supply 288 and exiting back to fan and miner section 148. In some embodiments, mining computer 124 may not include power supply fan 292. This may permit reduction in power consumed and noise generated by mining computer 124.

Computer housing 280 may provide an enclosure for the various components of mining computer 124 including cryptocurrency mining board 284, computer power supply 288, power supply fan 292 and computer control board 296. In some embodiments, computer housing 280 may include at least one mining board section air inlet 304 and at least one mining board section air outlet 308.

Referring now to FIG. 7, shown therein is a schematic illustration of air flows through mining computer 124 positioned in cryptocurrency mining furnace 100. In the example illustrated in FIG. 7, cryptocurrency mining furnace 100 includes air guide or deflector 324. Air guide 324 can have any design suitable to redirect air flow 320 (of air flow path 128) exiting principal fan 120 upwards towards mining computer 124. In the absence of air guide 324, the air flow 320 exiting principal fan 120 can hit the walls of furnace housing 104 causing vibration and additional noise. Instead, air guide 324 can redirect the air flow 320 exiting principal fan 120 towards mining computer 124. The redirected air flow 316 of air flow path 128 may flow from fan and miner section 148 into computer housing 280 at mining board section air inlet 304. Air flow 316 of air flow path 128 may flow out of computer housing 280 from mining board section air outlet 308 to exhaust section 152. Air flow 316 can provide air cooling of cryptocurrency mining board 284 positioned inside computer housing 280. In other embodiments, mining computer 124 may not include computer housing 280.

A conventional mining computer provided by an OEM supplier may include one or more mining computer fans positioned in the computer housing to induce air flow into mining board section air inlet and out of mining board section air outlet. For example, a conventional mining computer may include a first mining computer fan positioned at the mining board section air inlet to induce air flow into the computer housing and a second mining computer fan positioned at the mining board section air outlet to induce air flow out of the computer housing. An example cryptocurrency mining furnace with 21 mining computers may include 42 mining computer fans, each consuming additional power and generating additional noise. Furthermore, the air flow induced by the principal fan may cause the mining computer fans to overspeed and generate loud, high-frequency noise.

The described apparatuses and methods can provide an advantage over using such conventional mining computers by excluding the mining computer fans. In the illustrated example, all of air flow 316 of air flow path 128 is induced by principal fan 120. This allows principal fan 120 to provide all of the required cooling air flow through the mining board section, thereby enabling operation of mining computer 124 without (i.e., free of) mining computer fans. For clarity, the cryptocurrency mining boards 284 may be fanless and none of mining computers 124 may have an air moving device (fan or otherwise) that provides cooling to their cryptocurrency mining board 284.

In some embodiments, computer control board 296 that may have been designed for conventional mining computers may require the presence and operation of mining computer fans to allow operation of cryptocurrency mining board 284. Mining computer 124 may include specialized firmware that simulates the presence and operation of the mining computer fans to meet the operating requirements of computer control board 296.

In some embodiments, a spacer 328 may be used during positioning of mining computers 124 in furnace housing 104. Spacer 328 may be attached on one side to mining computer 124 at mining board section air outlet 308 and may occupy the space that would otherwise be occupied by a mining computer fan in a conventional mining computer. Spacer 328, along with mining computer 124, may be mounted to plate 332. Plate 332 can be made of any rigid material providing sufficient structural strength and integrity to support mining computer 124 and spacer 328.

Figure 8:
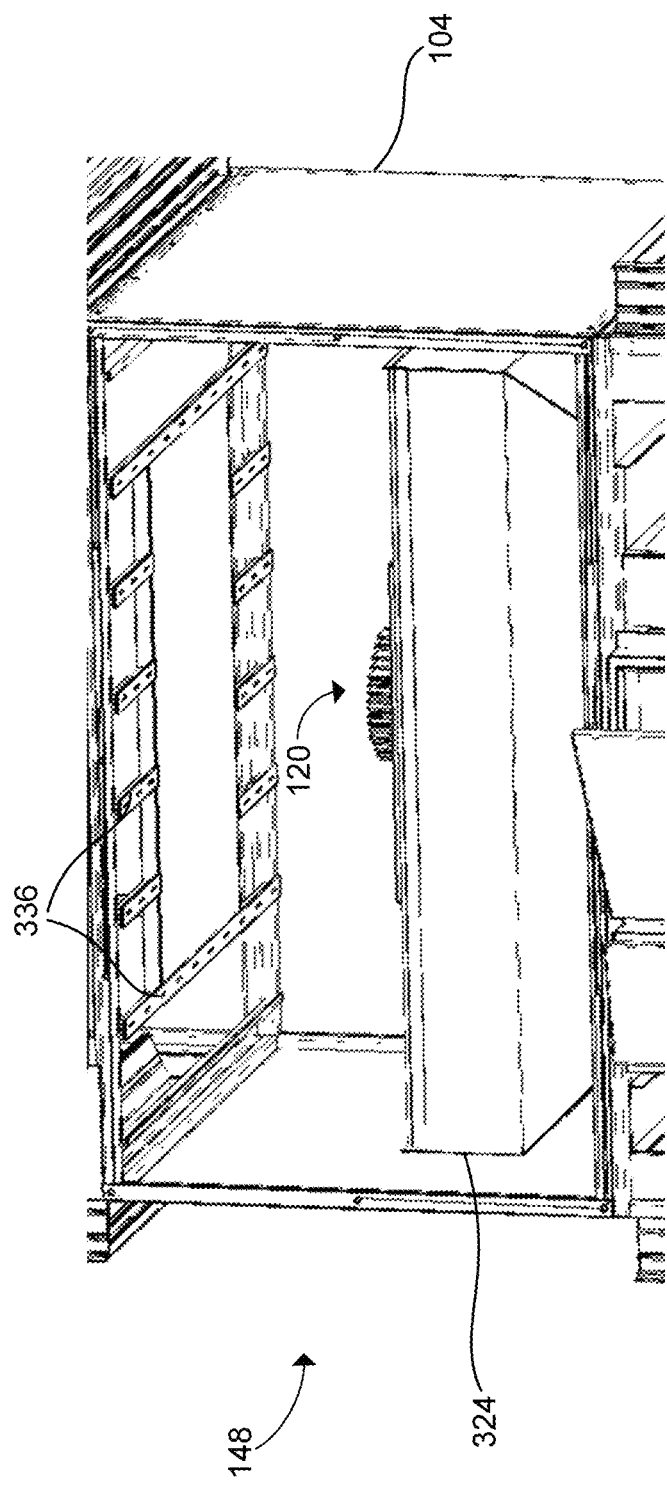
FIG. 8 is a perspective view of a fan and miner section of the cryptocurrency mining furnace of FIG. 1.

Referring now to FIG. 8, shown therein is a perspective view of fan and miner section 148 of furnace housing 104. Furnace housing 104 may include multiple rails 336 disposed at the boundary between fan and miner section 148 and exhaust section 152 (FIG. 4). Referring now to FIGS. 7 and 8, multiple plates 332 along with corresponding attached mining computers 124 and spacers 328 may be slid into position along rails 336. Plates 332 can enable multiple mining computers 124 to be mounted adjacent to each other in a row and slid into position along rails 336. In some embodiments, furnace housing 104 can include multiple rows, with each row including multiple mining computers 124. Rails 336 can be made of any rigid material providing sufficient structural strength and integrity to support mining computers 124, spacers 328 and plates 332.

Referring back to FIG. 7, spacers 328 can prevent direct air flow between fan and miner section 148 and exhaust section 152 that bypasses mining computer 124. Presence of spacer 328 can force induced air flow of air flow path 128 to flow into mining board section air inlet 304, through mining computer 124 and out from mining board section air outlet 308 to exhaust section 152.

Referring back to FIG. 6, mining computer 124 may include any number of cryptocurrency mining boards 284. In some embodiments, mining computer 124 may include three cryptocurrency mining boards 284. This may enable mining computer 124 to have sufficient processing power to profitably mine cryptocurrency. In other embodiments, mining computer 124 may include one or two cryptocurrency mining boards 168. This may enable reduction in power consumption of mining computer 124. In other embodiments, mining computer 124 may include more than three cryptocurrency mining boards 284 (e.g., 2-8 cryptocurrency mining boards 284). This may enable higher processing power for mining computer 124.

Cryptocurrency mining board 284 can have any design suitable for performing cryptocurrency mining operations. In some embodiments, cryptocurrency mining board 284 may include any processing device suitable for contributing computing power for running a hashing algorithm for mining cryptocurrency. For example, the processing device may include a central processing unit (CPU), a graphical processing unit (GPU), a field programmable gate array (FPGA) or an application specific integrated circuit (ASIC). In the illustrated example, cryptocurrency mining board 284 may be a hashboard. In many cases, a hashboard may provide better mining power efficiency (i.e., a lower power consumption to mining hashrate ratio) than other options. In other embodiments, cryptocurrency mining board 284 may not be a hashboard.

In some embodiments, cryptocurrency mining board 168 may include heatsink structures 340 to dissipate heat generated during cryptocurrency mining operations. The induced air flow of air flow path 128 may flow through the space around the heat sink structures 340 transporting heat energy away from mining computers 124.

In some embodiments, the hashrate of mining computer 124 may be greater than 50 Th/s, such as for example 50 Th/s to 1500 Th/s (e.g., 68 Th/s to 126 Th/s). The higher hashrates may permit faster mining of cryptocurrency by mining computer 124. In other embodiments, the hashrate of mining computer 124 may be less than 50 Th/s (e.g., 30 Th/s to 50 Th/s). This may enable mining computer 124 to operate at lower power consumption levels. In other embodiments, the hashrate of mining computer 124 may be greater than 150 Th/s. This may enable mining computer 124 to mine cryptocurrency at higher rates.

The power consumption of mining computer 124 may be greater than 2000 W, such as for example 2000 W to 5000 W (e.g., 3200 W to 3750 W). Mining computer 124 with higher power consumption can typically provide higher hashrates and faster mining of cryptocurrency. In other embodiments, the power consumption of mining computer 124 may be less than 2000 W (e.g., 1500 W to 2000 W). This may enable operation of cryptocurrency mining furnace 100 with reduced cooling air flow requirements and reduced noise levels. In other embodiments, the power consumption of mining computer 124 may be greater than 5000 W (e.g., 5000 W to 10000 W). This may enable mining computer 124 to provide higher hashrates and faster mining of cryptocurrency.

In some embodiments, mining computers 124 may be operated in an overclocked configuration that consumes at least 5% (e.g., 10%-50%) more power compared with non-overclocked operation. This may permit mining computer 124 to operate at higher hashrates but at the cost of higher power consumption resulting in higher heat generation. In some embodiments, computer control board 296 may control timing of when mining computers 124 are overclocked. For example, mining computers 124 may only be overclocked during 6-8 cooler months of the year and not overclocked during the remaining warmer months of the year. In other examples, computer control board 296 may not control the timing of when mining computers 124 are overclocked and mining computers 124 may be overclocked during all months of the year or never overclocked.

Referring back to FIG. 4, in some embodiments, cryptocurrency mining furnace 100 may include air filter 344 positioned in furnace housing 104 in air flow path 128 upstream of transformer 116. Air induced through housing air inlets 108 into furnace housing 104 may include dust particles that can attach to and clog up various component of cryptocurrency mining furnace 100, e.g., heatsink structures 340 (FIG. 6) of mining computers 124 and fan impeller 256 of principal fan 120. The contamination of the heatsink structures may reduce cooling efficiency of the heatsink structures that can result in overheating and/or shutdown of the mining computers. This may cause reduction in operation lifetime of the mining computers and thereby reduce the profitability of cryptocurrency mining furnace 100. Additionally, the clogging up of various components by dust particles may impair proper air flow of induced air along air flow path 128 and principal fan 120 may have to operate at higher speeds (resulting in increased power consumption and noise production) to provide required amounts of induced air flow along air flow path 128. Air filters 344 can filter out at least a portion of the dust particles from air induced through housing air inlets 108 and can enable efficient operation of the heatsink structures and proper air flow of induced air along air flow path 128.

Cryptocurrency mining furnace 100 may include any number of air filters 344. For example, cryptocurrency mining furnace 100 may include a total of eight air filters. Four air filters (two of which, air filter 344a and air filter 344b are shown in FIG. 4) may be positioned to filter induced air flow entering housing air inlet 108a. Four air filters (two of which, air filter 344c and air filter 344d are shown in FIG. 4) may be positioned to filter induced air flow entering housing air inlet 108b. In other embodiments, depending on relative size of the housing air inlets 108 and air filters 344, cryptocurrency mining furnace 100 may include fewer than or greater than eight air filters (e.g., 1-7 or 9-16). In some embodiments, cryptocurrency mining furnace 100 may include no air filters.

Air filter 344 can have any design suitable for filtering dust and other particulates out of induced air flow entering furnace housing 104 at housing air inlet 108. In some embodiments, air filter 344 may be at least 10" in width (e.g., 10"-30"), at least 10" in height (e.g., 10"-30") and at least 2" in depth (e.g., 2"-6"). Larger width and height dimensions of air filter 344 can enable greater surface area allowing for same level of air filtration (as a smaller air filter) with less pressure drop along air flow path 128. Larger width, height and depth dimensions of air filter 344 may enable larger capture volumes allowing air filter 344 to be replaced less often. As an example, air filter 344 may be 20"×20"×4" in size. In other embodiments, air filter 344 may have a width smaller than 10" (e.g., 5" to 10"), a height smaller than 10" (e.g., 5" to 10") and/or a depth smaller than 2" (e.g., 1" to 2"). This may permit a smaller and lighter design of furnace housing 104. In other embodiments, air filter 344 may have a width larger than 10" (e.g., 10" to 15"), a height larger than 10" (e.g., 10" to 15") and/or a depth larger than 2" (e.g., 2" to 18"). This may permit larger amounts of induced air to be filtered at low pressure drops along air flow path 128. In some embodiments, a larger depth of 18" may enable "self cleaning" operation of air filters 344 wherein captured dust particles collect at the bottom enabling longer operation lifetimes before air filters 344 need to be replaced.

During operation of cryptocurrency mining furnace 100, the air flow resistance of air filter 344 may increase (compared with initial installation) as amount of dust and other particulates captured by air filter 344 increases. Accordingly, principal fan 120 may be required to operate at higher speeds to maintain the same amount of induced air flow through air flow path 128. In some embodiments, the operation speed of principal fan 120 may be automatically increased based on usage status of air filter 344. The usage status of air filter 344 may be based on, for example, volume of air (e.g., cubic feet) that has been filtered, or amount of time (e.g., hours) of runtime, or measured pressure values within air flow path 128 (e.g., difference in air pressures measured on either side of air filter 344). For example, Control device 130 may provide the control signal for automatic speed adjustment of principal fan 120. In other embodiments, the operation speed of principal fan 120 may not be automatically increased based on usage status of air filter 344.

In some embodiments, furnace housing 104 may comprise noise cancelling panel 348 surrounding at least a portion of fan and miner section 148. Furnace housing 104 may include any number of noise cancelling panels 348. For example, furnace housing 104 may include four noise cancelling panels 348 (one on each side of furnace housing 104 and two of which, 348a and 348b, are shown in FIG. 4) surrounding at least a portion (and preferably a majority or entirety) of fan and miner section 148. In some embodiments, noise cancelling panels 348 may entirely surround fan and miner section 148 providing higher noise reduction compared with embodiments where noise cancelling panels 348 only partially surround fan and miner section 148. Depending on the noise reduction requirements and the geometry of furnace housing 104 and noise cancelling panels 348, in other embodiments, furnace housing 104 may include fewer or more than four noise cancelling panels 348 (e.g., 0 to 3 or 5 to 8). Alternatively, or in addition, furnace housing 104 may include noise cancelling panels 348 surrounding at least a portion of (e.g., a majority of or an entirety of) transformer section 144 and/or exhaust section 152. This may enable reduction in noise generated within transformer section 144 and/or exhaust section 152 from travelling outside furnace housing 104. For an example cryptocurrency mining furnace 100 including housing air outlets 112 on two sides of exhaust section 152, furnace housing 104 may include three noise cancelling panels 348 surrounding exhaust section 152 on the remaining two sides and the top.

Noise cancelling panel 348 can have any design suitable for reducing noise generated within furnace housing 104 from travelling outside furnace housing 104. In some embodiments, a noise cancelling panel 348 may include a foam and foil style glue back insulation. In other embodiments, noise cancelling panel 348 may include sheet metal or fabric style insulation material. As one example, noise cancelling panel 348 may provide a noise reduction of at least 10%, such as 10% to 75% (e.g., 50%) at a distance of 1 m from housing air outlet 112. For example, noise cancelling panel 348 may provide a noise reduction from 94 dB to 52 dB at a distance of 1 meter from housing air outlet 112. The reduction in noise may provide less disturbance to occupants of building 10 (FIG. 1) and adjacent neighbors. In other examples, noise cancelling panel 348 may provide smaller (e.g., 5% to 10%) or larger (e.g., 75% to 85%) noise reductions.

In some embodiments, temperature sensor 352 may be positioned in furnace housing 104 in air flow path 128. Any number of temperature sensors 352 may be positioned in furnace housing 104 in air flow path 128. For example, three temperature sensors 352 may be positioned in furnace housing 104 in air flow path 128—a first temperature sensor 352a may be mounted inside the center winding of transformer 116 to monitor the temperature of transformer 116, a second temperature sensor 352b may be mounted above principal fan 120 in fan and miner section 148, and a third temperature sensor 352c may be mounted in exhaust section 152. In other embodiments, fewer than three (e.g., 1 or 2) temperature sensors 352 may be positioned in furnace housing 104 in air flow path 128. This may reduce cost and complexity of control circuitry. In other embodiments, more than three (e.g., 4 to 10) temperature sensors 352 may be positioned in furnace housing 104 in air flow path 128. This may permit temperature measurements at greater number of locations and/or multiple temperature measurements at a location thereby providing higher accuracy and additional monitoring of components of cryptocurrency mining furnace 100.

Referring back to FIG. 1, in some embodiments, additional temperature sensor 352d may be positioned in building 10. For example, the additional temperature sensor 352*d* may be positioned in building 10 up to 100 ft away from furnace housing 104. In other embodiments, additional temperature sensor 352*d* may not be positioned in building 10.

Referring now to FIGS. 1 to 4, temperature sensor 352 can have any design suitable for sensing temperature. In some embodiments, temperature sensor 352 may provide sensed temperature data to control device 130. Control device 130 may use the sensed temperature data to control operations of cryptocurrency mining furnace 100. As one example, control device 130 may use the sensed temperature data to control the temperature of air induced into air flow path 128 by adjusting the positions of inlet damper assemblies 184 at housing air inlets 108 to control mixing of air induced from the interior environment of building 10 and air induced from the outdoor environment. As another example, control device 130 may use the sensed temperature data to control the exhaust ratio of quantity of warm air flowing out of interior-coupled outlets to the quantity of warm air flowing out of exterior-coupled outlets by adjusting the outlet damper assemblies 188 at housing air outlets 112. For example, if the sensed temperature data indicates that the temperature of building 10 is lower than a setpoint temperature, the outlet damper assembly 188 at an interior-coupled outlet 112 may be moved towards the open position to warm up building 10 by providing larger amount of warm air flow to building 10. If the sensed temperature data indicates that the temperature of building 10 is higher than a setpoint temperature, the outlet damper assembly 188 at an interior-coupled outlet 112 may be moved towards the closed position to reduce warming of building 10 by reducing the amount of warm air flow to building 10. In other embodiments, the sensed temperature data may not be provided to control device 130.

In some embodiments, cryptocurrency mining furnace 100 may include a high temperature switch 354 configured to detect a high temperature event, for example, a fire. High temperature switch 354 may be hardwired to stop principal fan 120 and move the inlet and outlet damper assemblies towards the closed position. In some embodiments, all the inlet damper assemblies 184 and outlet damper assemblies 188 may include a spring-return motorized mechanism that can close all the damper assemblies if the sensed temperature data indicates a high temperature or fire event. This can stop air flow being induced into air flow path 128 and prevent oxygen being added to the fire event.

In some embodiments, control device 130 may be positioned on furnace housing 104. In other embodiments, control device 130 may not be positioned on furnace housing 104. control device 130 may be electrically connected to one or more of mining computers 124, transformer 116, principal fan 120, inlet damper assemblies 184, outlet damper assemblies 188 and temperature sensor 224.

Figure 9:
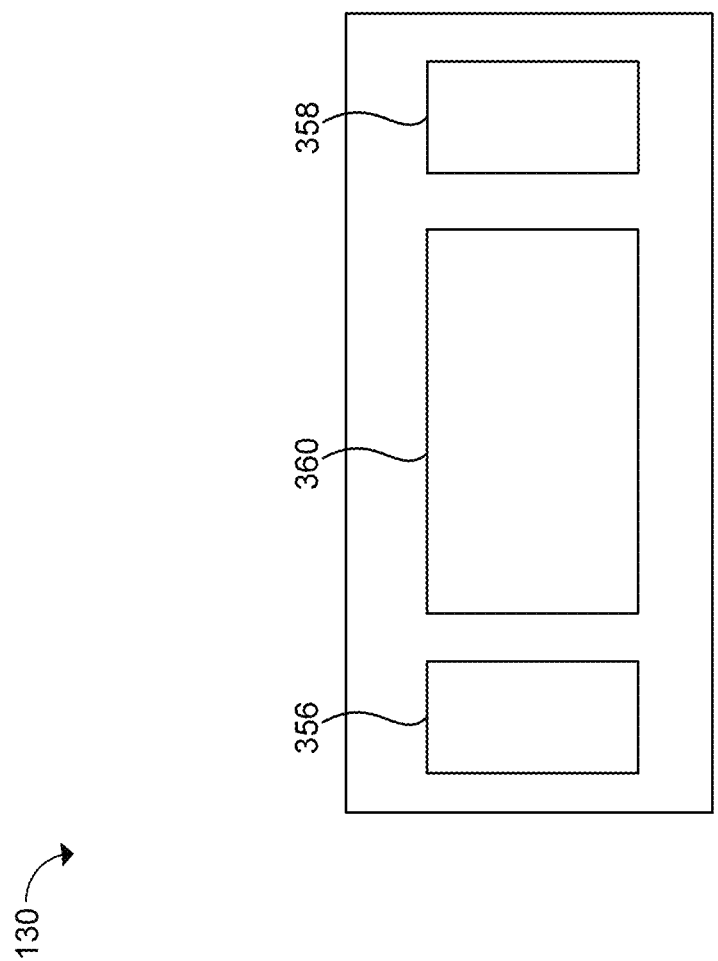
FIG. 9 is a schematic illustration of a control device of the cryptocurrency mining furnace of FIG. 1.

Referring now to FIG. 9, shown therein is a schematic illustration of a control device 130. In some embodiments, control device 130 may comprise a programmable logic controller (PLC) 356, an I/O module 358 and a display panel 360. The PLC 356 of control device 130 can have any design suitable to perform the control operations provided by control device 130 described herein. The I/O module 358 can have any design suitable to receive analog and/or digital inputs from, and to provide analog and/or digital outputs to components of the cryptocurrency mining furnace including, for example, the principal fan, the inlet and outlet damper assemblies, and the temperature sensors. In some embodiments, the I/O module may include separate modules for analog and digital signals. In some embodiments, the I/O module 358 may be integrated within PLC 356. The display panel 360 of control device 130 may include a human machine interface (HMI), for example, a touchscreen display positioned on an external surface of furnace housing 104 (FIG. 4).

Figure 10:
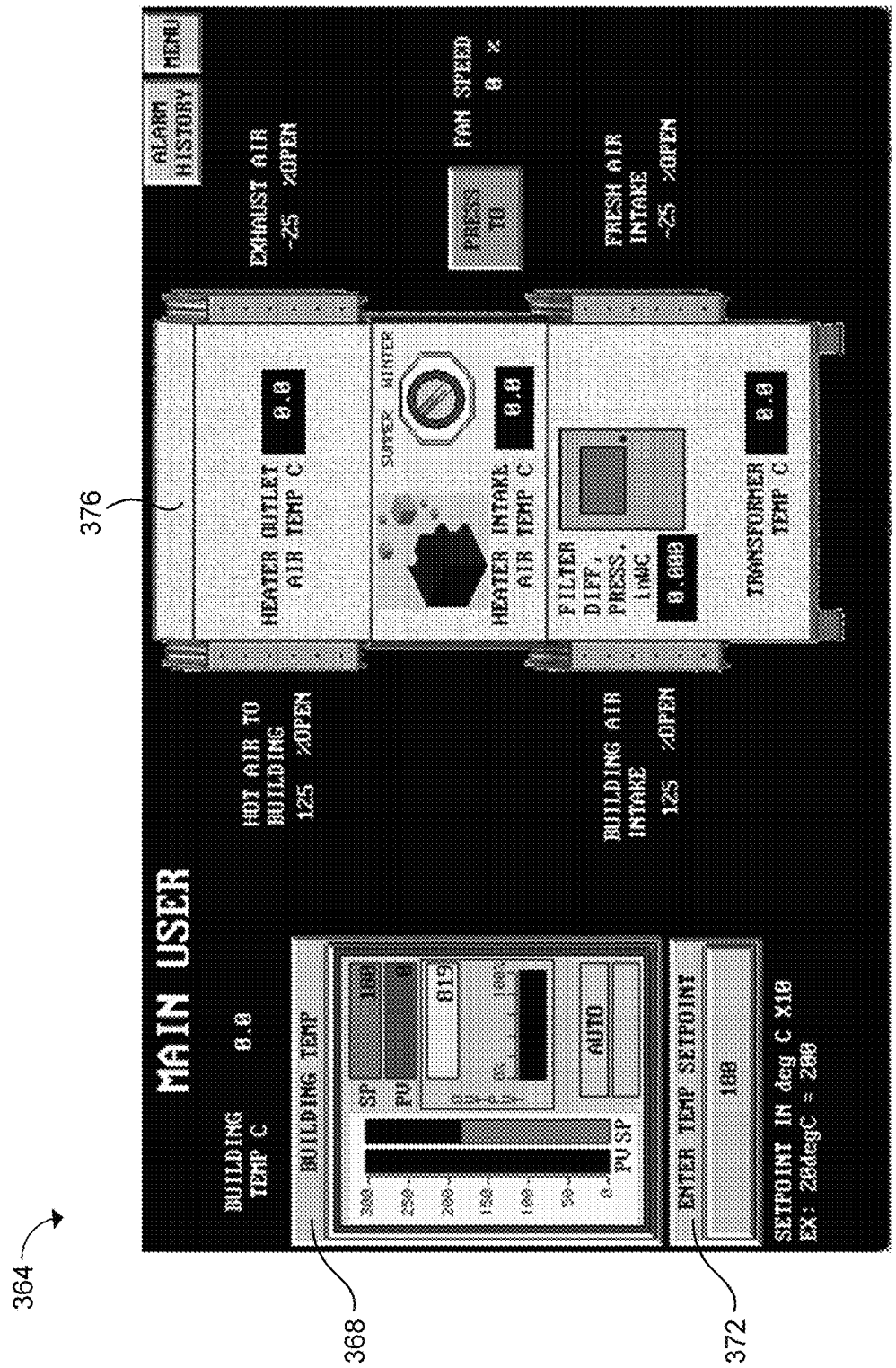
FIG. 10 is an example user interface provided by a display panel of the cryptocurrency mining furnace of FIG. 1.

Referring now to FIG. 10, shown therein is an example user interface 364 provided by the display panel 360 of control device 130. User interface 364 may include window 368, window 372 and window 376.

Referring now to FIGS. 1, 2, 4, and 10, window 368 may display the setpoint and actual measured temperatures of interior environment of building 10. The actual measured temperature may be provided, for example, by temperature sensor 352*d*. Window 372 may enable a user to provide control input to change the setpoint temperature of interior environment of building 10. Window 376 may display an icon representing cryptocurrency mining furnace 100 and information including status of inlet damper assemblies 184 and outlet damper assemblies 188, status of air filter 344, temperature of transformer 116, temperature of air flow of air flow path 128 at housing air inlet 108 and housing air outlet 112, and fan speed status of principal fan 120. Window 376 may also enable a user to provide control input to change the status of one or more of the inlet damper assemblies 184 and outlet damper assemblies 188, change the weather-based settings of cryptocurrency mining furnace 100 and fan speed of principal fan 120. In other embodiments, user interface 364 may include fewer or more windows, display additional or fewer information and provide additional or fewer control options to a user. In some embodiments, control device 130 may not provide user interface 364. For example, control device 130 may execute computer-readable instructions to provide automatic control of cryptocurrency mining furnace 100.

Figure 11:
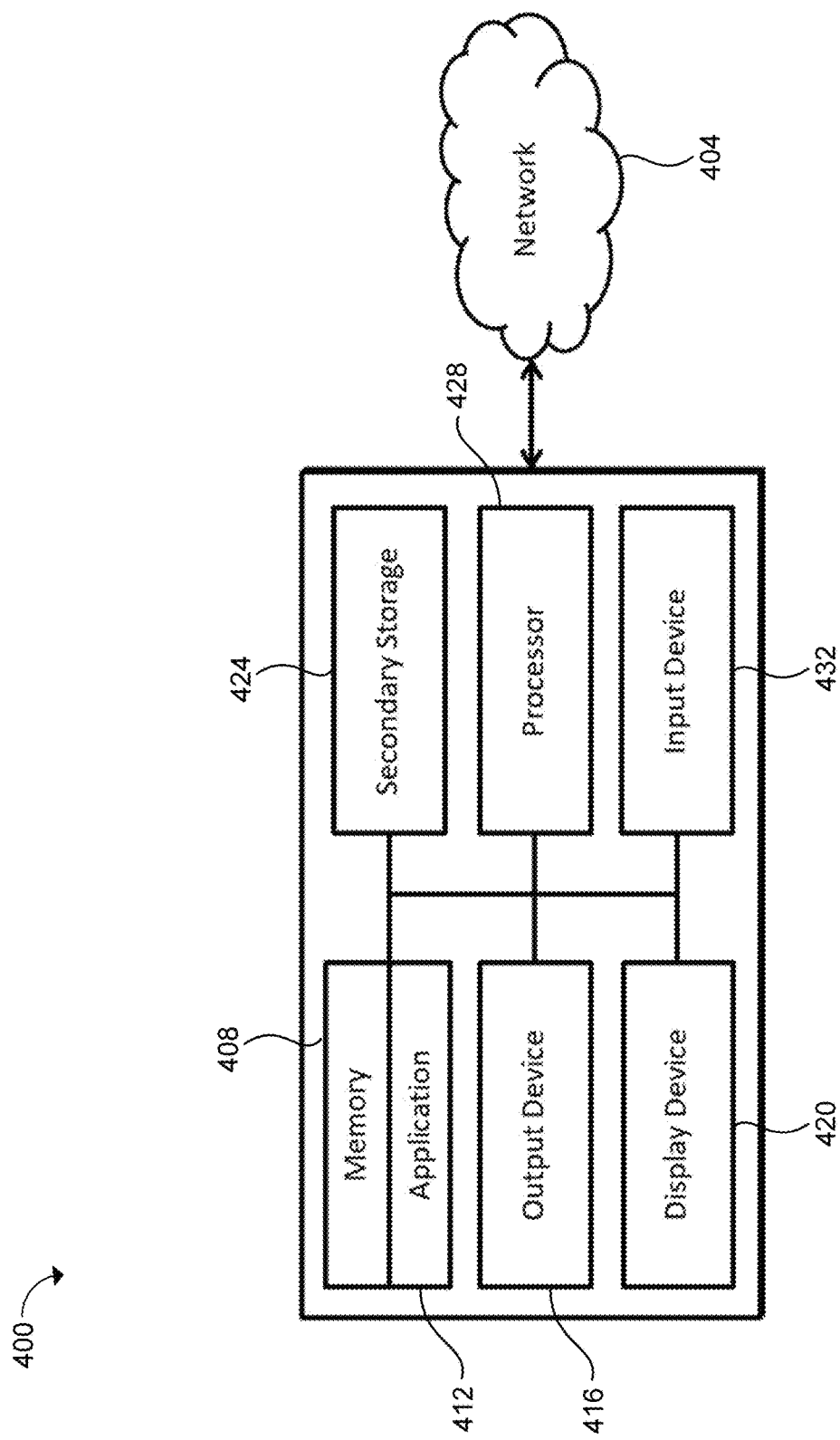
FIG. 11 is a schematic illustration of a device of the cryptocurrency mining furnace of FIG. 1.

Referring now to FIG. 11, shown therein is a schematic illustration of device 400. As shown, device 400 is generally illustrated as having hardware components, which may represent the configuration of one or more of the elements of control device 130 (FIG. 9). Generally, device 400 can be a server computer, desktop computer, notebook computer, tablet, PDA, smartphone, a PLC/special purpose device or another computing device. In at least one embodiment, device 400 includes a connection with a network 404 such as a wired or wireless connection to the Internet or to a private network. In some cases, network 404 includes other types of computer or telecommunication networks.

In the example shown, device 400 includes a memory 408, an application 412, an output device 416, a display device 420, a secondary storage device 424, a processor 428, and an input device 432. In some embodiments, device 400 includes multiple of any one or more of memory 408, application 412, output device 416, display device 420, secondary storage device 424, processor 428, and input device 432. In some embodiments, device 400 does not include one or more of applications 412, secondary storage devices 424, network connections, input devices 432, output devices 416, and display devices 420.

Memory 408 can include random access memory (RAM) or similar types of memory. Also, in some embodiments, memory 408 stores one or more applications 412 for execution by processor 428. Applications 412 correspond with software modules including computer executable instructions to perform processing for the functions and methods described herein. Secondary storage device 424 can include a hard disk drive, floppy disk drive, CD drive, DVD drive, Blu-ray drive, solid state drive, flash memory or other types of non-volatile data storage.

In some embodiments, device 400 stores information in a remote storage device, such as cloud storage, accessible across a network, such as network 404 or another network. In some embodiments, device 400 stores information distributed across multiple storage devices, such as memory 408 and secondary storage device 424 (i.e., each of the multiple storage devices stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 428 can execute applications, computer readable instructions or programs. The applications, computer readable instructions or programs can be stored in memory 408 or in secondary storage 424, or can be received from remote storage accessible through network 404, for example. When executed, the applications, computer readable instructions or programs can configure the processor 428 (or multiple processors 428, collectively) to perform the acts described herein with reference to control device 130, for example.

Input device 432 can include any device for entering information into device 400. For example, input device 432 can be a keyboard, keypad, cursor-device, touchscreen, camera, or microphone. Input device 432 can also include input ports and wireless radios (e.g., Bluetooth®, or 802.11x) for making wired and wireless connections to external devices. As another example, FIG. 10 shows an example of user interface 364 on an input device 432 that is a touchscreen device.

Display device 420 can include any type of device for presenting visual information. For example, display device 420 can be a computer monitor, a flat-screen display, a projector or a display panel. As another example, display device 420 can be display panel 360 (FIG. 9) of control device 130.

Output device 416 can include any type of device for presenting a hard copy of information, such as a printer for example. Output device 416 can also include other types of output devices such as speakers, for example. In at least one embodiment, output device 416 includes one or more of output ports and wireless radios (e.g., Bluetooth®, or 802.11x) for making wired and wireless connections to external devices.

FIG. 11 illustrates one example hardware schematic of a device 400. In alternative embodiments, device 400 contains fewer, additional or different components. In addition, although aspects of an implementation of device 400 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Figure 12:
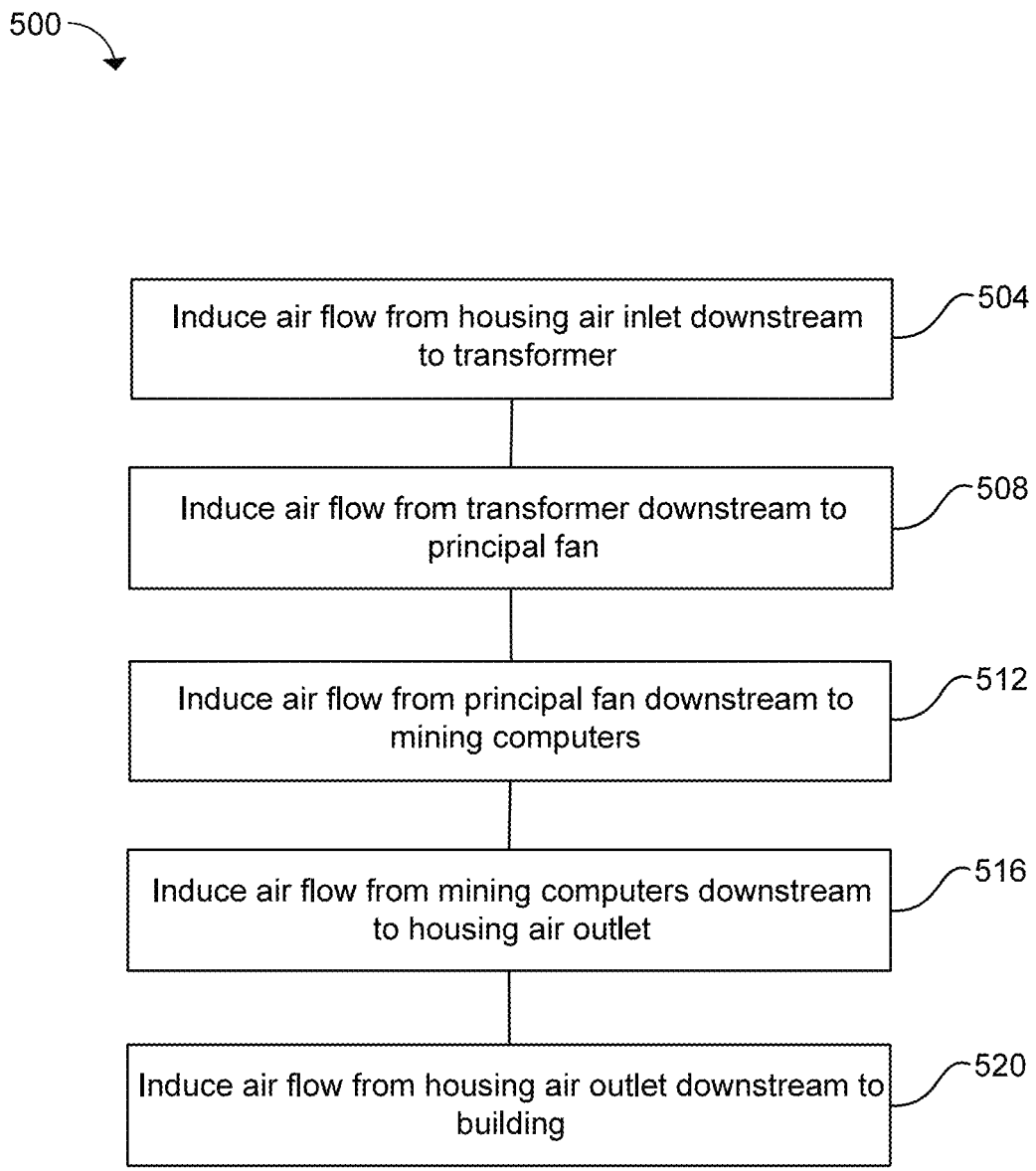
FIG. 12 is a flowchart illustrating an example method of operation of the cryptocurrency mining furnace of FIG. 1.

Referring now to FIG. 12, shown therein is a flowchart illustrating an example method 500 of operation of a cryptocurrency mining furnace. For example, method 500 may be executed for operation of cryptocurrency mining furnace 100 (shown in FIGS. 1 to 4).

Referring now to FIGS. 1-4 and 12, method 500 may be performed at various times, for example by control device 130, for the operation of cryptocurrency mining furnace 100. Method 500 may be operated independently. For example, method 500 may be performed continuously or at a specific duration of time when cryptocurrency mining furnace 500 is in use or at regular time intervals. Method 500 may also be performed in response to a trigger condition, for example, a received user input or received sensor data.

At step 504, air flow may be induced from a housing air inlet in the furnace housing downstream to a transformer positioned in the furnace housing. For example, control device 130 may induce air flow from housing air inlet 108 of furnace housing 104. In some embodiments, control device 130 may induce the air flow by controlling speed of principal fan 120 and/or adjusting the position of inlet damper assemblies 184 at housing air inlet 108. control device 130 may induce the air flow in response to temperature data received from temperature sensor 352. As one example, the temperature data may indicate that cooling of transformer 116 or mining computers 124 is required. As another example, the temperature data may indicate that heating of building 10 is required.

At step 508, air flow may be induced from the transformer downstream to the principal fan. For example, control device 130 may induce the air flow from transformer 116 downstream to principal fan 120. In cases where control device 130 induced the air flow at step 504 in response to temperature data indicating that cooling of transformer 116 is required, control device 130 may control speed of principal fan 120 and/or adjust the position of inlet damper assemblies 184 at housing air inlet 108 to provide sufficient induced air to provide required cooling for transformer 116.

At step 512, air flow may be induced from the principal fan downstream to the mining computers. For example, control device 130 may induce the air flow from principal fan 120 downstream to mining computers 124. In cases where control device 130 induced the air flow at step 504 in response to temperature data indicating that cooling of mining computers 124 is required, control device 130 may control speed of principal fan 120 and/or adjust the position of inlet damper assemblies 184 at housing air inlet 108 to provide sufficient induced air to provide required cooling for mining computers 124.

At step 516, air flow may be induced from the mining computers downstream to the housing air outlet. For example, control device 130 may induce the air flow from mining computers 124 downstream to housing air outlet 112.

At step 520, air flow may be induced from the housing air outlet downstream to the building. For example, control device 130 may induce the air flow from housing air outlet 112 downstream to building 10. In cases where control device 130 induced the air flow at step 504 in response to temperature data indicating that additional heating of building 10 is required, control device 130 may adjust the position of outlet damper assemblies 188 at housing air outlet 112 to increase the quantity of warm air flowing out of interior-coupled outlets to building 10.

The described apparatuses and methods can reduce noise generated during cryptocurrency mining operations compared to an apparatus without one or more (or all) of the use of a principal fan, omission of the mining computer fans on mining computers for their cryptocurrency mining boards, extension of the air flow path length from the housing air inlet to the principal fan relative to the spatial distance between the housing air inlet and the principal fan, extension of the air flow path length from the principal fan to the housing air outlet relative to the spatial distance between the principal fan and the housing air outlet, and provision of noise cancelling panels. In some embodiments, the described apparatuses and methods may provide an average noise reduction of at least 6 dB, such as 6 dB to 18 dB (e.g., 10 dB). The reduction in noise may provide less disturbance to occupants of building 10 (FIG. 1) and adjacent neighbors. In other embodiments, the described apparatuses and methods may provide an average noise reduction smaller than 6 dB (e.g., 3 dB to 6 dB) or greater than 18 dB (e.g., 18 dB to 24 dB). In some embodiments, the removal of the mining computer fans may provide noise reduction of 12 dB to 14 dB in the 4 kHz to 8 kHz range that corresponds to a sensitive audio range for humans.

Table 1 below provides a summary of example noise level measurements at a distance of one meter from corresponding cryptocurrency mining furnace 100 locations. The example noise level measurements were conducted for an example cryptocurrency mining furnace including a principal fan that generates 87 dB noise at the fan housing air inlet and 94 dB noise at the fan housing air outlet. The example noise level measurements at each location were conducted for two different conditions—with the corresponding damper assembly (i.e., inlet damper assembly 184 for a housing air inlet 108 and outlet damper assembly 188 for a housing air outlet 112) fully open and fully closed. The example noise level measurements were conducted in summer weather corresponding to higher average fan speeds and higher noise compared with winter weather operations.

TABLE 1

Example noise level measurements during operation of cryptocurrency mining furnace 100

| Measurement Location | Damper assembly open | Damper assembly closed |
|---|---|---|
| Housing air outlet to interior environment of building | 71 dB | 56 dB |
| Housing air inlet from interior environment of building | 61 dB | 52 dB |
| Housing air outlet to outdoor environment | 58 dB | 52 dB |
| Housing air inlet from outdoor environment | 55 dB | 51 dB |

The noise level measurements can vary based on different factors including the fan speed of principal fan 120, amount of air flow induced through air flow path 128 and presence of noise cancelling panels 348. Accordingly, the example noise level measurements summarized in table 1 may not be representative of all operating conditions of cryptocurrency mining furnace 100. The noise level measurements may be higher or lower under different operation conditions. Additionally, the noise level measurements may be higher or lower for different embodiments of cryptocurrency mining furnace 100 depending on factors including number and power rating of mining computers 124; number, type and size of principal fan 120; number, type and size of housing air inlet 108 and housing air outlet 112; and path lengths of different portions of air flow path 128.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A cryptocurrency mining furnace comprising: a furnace housing having an air flow path extending from a housing air inlet downstream to a housing air outlet; at least three separate mining computers, each mining computer having at least one cryptocurrency mining board, each mining computer positioned in the furnace housing in the air flow path upstream of the housing air outlet; a transformer positioned in the furnace housing upstream of the mining computers and downstream of the housing air inlet, the transformer electrically connected to each of the mining computers to power each of the mining computers; and a principal fan positioned in the furnace housing in the air flow path downstream of the transformer and upstream of the mining computers to induce air flow along the air flow path through the transformer and each of the mining computers.

Item 2: The cryptocurrency mining furnace of any preceding item, wherein: the transformer is a forced cooled transformer having a primary air flow path running through the transformer; and the air flow path comprises: the primary air flow path; and a secondary air flow path running in parallel to the primary air flow path extending around the exterior of the transformer.

Item 3: The cryptocurrency mining furnace of any preceding item, wherein: the furnace housing has a fan section positioned downstream of the transformer containing the principal fan and each of the mining computers; and the furnace housing further comprises one or more composite noise cancelling panels surrounding at least a portion of the fan section.

Item 4: The cryptocurrency mining furnace of any preceding item, wherein: the fan section comprises an air guide configured to redirect air flow exiting the principal fan towards the at least three separate mining computers.

Item 5: The cryptocurrency mining furnace of any preceding item, wherein: the principal fan is a centrifugal fan.

Item 6: The cryptocurrency mining furnace of any preceding item, wherein: the cryptocurrency mining boards of the at least three separate mining computers are fanless.

Item 7: The cryptocurrency mining furnace of any preceding item, wherein: each of the at least three separate mining computers comprises a power supply unit; and each of the power supply units includes a power supply fan positioned outside of the air flow path.

Item 8: The cryptocurrency mining furnace of any preceding item, further comprising: at least one adjustable inlet damper positioned in the furnace housing at the housing air inlet, the at least one adjustable inlet damper being incrementally adjustable between an open position and a closed position.

Item 9: The cryptocurrency mining furnace of any preceding item, further comprising: at least one adjustable outlet damper positioned in the furnace housing at the housing air outlet, the at least one adjustable outlet damper being incrementally adjustable between an open position and a closed position.

Item 10: The cryptocurrency mining furnace of any preceding item, further comprising: at least one temperature sensor positioned in the furnace housing in the air flow path.

Item 11: The cryptocurrency mining furnace of any preceding item, further comprising: a control device positioned on the furnace housing, the control device electrically connected to each of the mining computers, the transformer, the at least one adjustable inlet damper, the at least one adjustable outlet damper, the at least one temperature sensor, and the principal fan; and wherein the control device is configured to adjust a position of the at least one adjustable inlet damper or the at least one adjustable outlet damper based at least in part on a signal from the at least one temperature sensor.

Item 12: The cryptocurrency mining furnace of any preceding item, wherein: at least one air filter is positioned in the furnace housing in the air flow path upstream of the transformer.

Item 13: The cryptocurrency mining furnace of any preceding item, wherein: the air flow induced by the principal fan along the air flow path is 3000-7500 CFM.

Item 14: The cryptocurrency mining furnace of any preceding item, wherein: an operating speed of the principal fan is 1000-2500 RPM.

Item 15: The cryptocurrency mining furnace of any preceding item, wherein: the principal fan comprises a fan impeller and the fan impeller is 450 mm in diameter.

Item 16: A cryptocurrency mining furnace comprising: a furnace housing having an air flow path extending from a housing air inlet downstream to a housing air outlet; at least three separate mining computers, each mining computer having at least one cryptocurrency mining board, each mining computer positioned in the furnace housing in the air flow path; and a principal fan positioned in the furnace housing in the air flow path downstream of the housing air inlet and upstream of the housing air outlet to induce air flow along the air flow path through each of the mining computers, wherein a shortest inlet air flow path length from the housing air inlet to the principal fan is at least 200% of a shortest spatial distance between the housing air inlet and the principal fan; and a shortest outlet air flow path length from the principal fan to the housing air outlet is at least 120% of a shortest spatial distance between the principal fan and the housing air outlet.

Item 17: A method of supplying heat to a building using the cryptocurrency mining furnace comprising: operating the principal fan to induce air to flow along the air flow path, withdrawing heat from the transformer and the at least three separate mining computers into the air flowing along the air flow path to form heated air, and discharging the heated air from the housing air outlet into ducting of a building fluidly coupled to the housing air outlet.

Item 18: A method of inducing air flow, from a cryptocurrency mining furnace to a building, by a principal fan positioned in a furnace housing of the cryptocurrency mining furnace, the method comprising: inducing air flow from a housing air inlet in the furnace housing downstream to a transformer positioned in the furnace housing, the transformer electrically connected to at least three separate mining computers positioned in the furnace housing to power each of the mining computers; inducing air flow from the transformer downstream to the principal fan; inducing air flow from the principal fan downstream to the mining computers, each mining computer having at least one cryptocurrency mining board; inducing air flow from the mining computers downstream to a housing air outlet in the furnace housing; and inducing air flow from the housing air outlet downstream to the building.

Item 19: A method of inducing air flow, from a cryptocurrency mining furnace to a building, by a principal fan positioned in a furnace housing of the cryptocurrency mining furnace, the method comprising: inducing air flow from a housing air inlet in the furnace housing downstream to the principal fan, wherein a shortest inlet air flow path length from the housing air inlet to the principal fan is at least 200% of a shortest spatial distance between the housing air inlet and the principal fan; inducing air flow from the principal fan downstream to at least three separate mining computers positioned in the furnace housing, each mining computer having at least one cryptocurrency mining board; inducing air flow from the mining computers downstream to a housing air outlet in the furnace housing, wherein a shortest outlet air flow path length from the principal fan to the housing air outlet is at least 120% of a shortest spatial distance between the principal fan and the housing air outlet; and inducing air flow from the housing air outlet downstream to the building.

I claim:

1. A cryptocurrency mining furnace comprising: a furnace housing having an air flow path extending from a housing air inlet downstream to a housing air outlet; at least three separate mining computers, each mining computer having at least one cryptocurrency mining board, each mining computer positioned in the furnace housing in the air flow path upstream of the housing air outlet; a transformer positioned in the furnace housing upstream of the mining computers and downstream of the housing air inlet, the transformer electrically connected to each of the mining computers to power each of the mining computers; and a principal fan positioned in the furnace housing in the air flow path downstream of the transformer and upstream of the mining computers to induce air flow along the air flow path through the transformer and each of the mining computers; wherein: the furnace housing has a fan section positioned downstream of the transformer containing the principal fan and each of the mining computers; and the furnace housing further comprises one or more composite noise cancelling panels surrounding at least a portion of the fan section.

2. The furnace of claim 1, wherein:
the transformer is a forced cooled transformer having a primary air flow path running through the transformer; and
the air flow path comprises:
the primary air flow path; and
a secondary air flow path running in parallel to the primary air flow path extending around the exterior of the transformer.

3. The furnace of claim 1, wherein:
the fan section comprises an air guide configured to redirect air flow exiting the principal fan towards the at least three separate mining computers.

4. The furnace of claim 1, wherein:
the principal fan is a centrifugal fan.

5. The furnace of claim 1, wherein:
the cryptocurrency mining boards of the at least three separate mining computers are fanless.

6. The furnace of claim 1, wherein:
each of the at least three separate mining computers comprises a power supply unit; and
each of the power supply units includes a power supply fan positioned outside of the air flow path.

7. The furnace of claim 1, further comprising:
at least one adjustable inlet damper positioned in the furnace housing at the housing air inlet, the at least one adjustable inlet damper being incrementally adjustable between an open position and a closed position.

8. The furnace of claim 1, further comprising:
at least one adjustable outlet damper positioned in the furnace housing at the housing air outlet, the at least one adjustable outlet damper being incrementally adjustable between an open position and a closed position.

9. The furnace of claim 8, further comprising:
at least one temperature sensor positioned in the furnace housing in the air flow path.

10. The furnace of claim 9, further comprising:
a control device positioned on the furnace housing, the control device communicatively connected to the at least one adjustable outlet damper, the at least one temperature sensor, and the principal fan; and
wherein the control device is configured to adjust a position of the at least one adjustable inlet damper or the at least one adjustable outlet damper based at least in part on a signal from the at least one temperature sensor.

11. The furnace of claim 1, wherein:
at least one air filter is positioned in the furnace housing in the air flow path upstream of the transformer.

12. The furnace of claim 1, wherein:
the air flow induced by the principal fan along the air flow path is 3000-7500 CFM.

13. The furnace of claim 1, wherein:
an operating speed of the principal fan is 1000-2500 RPM.

14. The furnace of claim 1, wherein:
the principal fan comprises a fan impeller and the fan impeller is 450 mm in diameter.

15. A cryptocurrency mining furnace comprising:
a furnace housing having an air flow path extending from a housing air inlet downstream to a housing air outlet;
at least three separate mining computers, each mining computer having at least one cryptocurrency mining board, each mining computer positioned in the furnace housing in the air flow path; and
a principal fan positioned in the furnace housing in the air flow path downstream of the housing air inlet and upstream of the housing air outlet to induce air flow along the air flow path through each of the mining computers, wherein
a shortest inlet air flow path length from the housing air inlet to the principal fan is at least 200% of a shortest spatial distance between the housing air inlet and the principal fan; and
a shortest outlet air flow path length from the principal fan to the housing air outlet is at least 120% of a shortest spatial distance between the principal fan and the housing air outlet.

16. A method of supplying heat to a building using the cryptocurrency mining furnace of claim 1 comprising:
operating the principal fan to induce air to flow along the air flow path,
withdrawing heat from the transformer and the at least three separate mining computers into the air flowing along the air flow path to form heated air, and
discharging the heated air from the housing air outlet into ducting of a building fluidly coupled to the housing air outlet.

17. A method of inducing air flow, from a cryptocurrency mining furnace to a building, by a principal fan positioned in a furnace housing of the cryptocurrency mining furnace, the method comprising: inducing air flow from a housing air inlet in the furnace housing downstream to a transformer positioned in the furnace housing, the transformer electrically connected to at least three separate mining computers positioned in the furnace housing to power each of the mining computers; inducing air flow from the transformer downstream to the principal fan; inducing air flow from the principal fan downstream to the mining computers, each mining computer having at least one cryptocurrency mining board; inducing air flow from the mining computers downstream to a housing air outlet in the furnace housing; and inducing air flow from the housing air outlet downstream to the building; wherein: the furnace housing has a fan section positioned downstream of the transformer containing the principal fan and each of the mining computers; and the furnace housing further comprises one or more composite noise cancelling panels surrounding at least a portion of the fan section.

18. A method of inducing air flow, from a cryptocurrency mining furnace to a building, by a principal fan positioned in a furnace housing of the cryptocurrency mining furnace, the method comprising:
inducing air flow from a housing air inlet in the furnace housing downstream to the principal fan, wherein a shortest inlet air flow path length from the housing air inlet to the principal fan is at least 200% of a shortest spatial distance between the housing air inlet and the principal fan;
inducing air flow from the principal fan downstream to at least three separate mining computers positioned in the furnace housing, each mining computer having at least one cryptocurrency mining board;
inducing air flow from the mining computers downstream to a housing air outlet in the furnace housing, wherein a shortest outlet air flow path length from the principal fan to the housing air outlet is at least 120% of a shortest spatial distance between the principal fan and the housing air outlet; and
inducing air flow from the housing air outlet downstream to the building.

* * * * *